(12) United States Patent
Palanki et al.

(10) Patent No.: US 9,154,352 B2
(45) Date of Patent: Oct. 6, 2015

(54) PRE-COMMUNICATION FOR RELAY BASE STATIONS IN WIRELESS COMMUNICATION

(75) Inventors: Ravi Palanki, San Diego, CA (US);
Alexei Yurievitch Gorokhov, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 12/763,788

(22) Filed: Apr. 20, 2010

(65) Prior Publication Data
US 2010/0265874 A1    Oct. 21, 2010

Related U.S. Application Data

(60) Provisional application No. 61/171,387, filed on Apr. 21, 2009.

(51) Int. Cl.
*H04B 7/14*    (2006.01)
*H04L 27/26*   (2006.01)
(Continued)

(52) U.S. Cl.
CPC .......... *H04L 27/2601* (2013.01); *H04B 7/2606* (2013.01); *H04L 5/005* (2013.01); *H04L 5/006* (2013.01); *H04L 5/0007* (2013.01); *H04L 5/0023* (2013.01); *H04L 5/0044* (2013.01); *H04L 5/0091* (2013.01); *H04L 5/16* (2013.01);
(Continued)

(58) Field of Classification Search
USPC ................................ 370/276–296, 310–350
See application file for complete search history.

(56) References Cited

U.S. PATENT DOCUMENTS

2004/0047284 A1*  3/2004  Eidson .......................... 370/203
2008/0032744 A1*  2/2008  Khan et al. ................. 455/562.1
(Continued)

FOREIGN PATENT DOCUMENTS

JP      H1032557 A      2/1998
JP      2009021975 A    1/2009
(Continued)

OTHER PUBLICATIONS

Seo et al, U.S. Appl. No. 61/168,209.*
(Continued)

*Primary Examiner* — Ricky Ngo
*Assistant Examiner* — Wei-Po Kao
(74) *Attorney, Agent, or Firm* — Jimmy Cheng

(57) ABSTRACT

Providing for wireless communication involving supplemental wireless nodes is described herein. By way of example, prior signaling is employed between a macro base station and a set of associated supplemental nodes to support pending wireless communication with a user terminal. In some aspects, the prior signaling can include control or data traffic transmitted to or received from the user terminal. In addition, the supplemental nodes can synchronize transmission or reception of the control or data traffic transmissions with similar transmission or reception of the macro base station. In some aspects, the supplemental nodes can also replicate pilot signal transmissions on OFDM symbols employed by the macro base station for pilot signals, to give consistent downlink channel for both traffic and pilot signals. Accordingly, the user terminal observes consistent pilot transmissions over various time slots, as well as concurrent traffic transmissions that can generally be decoded with a common reference signal.

48 Claims, 15 Drawing Sheets

(51) Int. Cl.
*H04B 7/26* (2006.01)
*H04L 5/00* (2006.01)
*H04L 5/16* (2006.01)
*H04W 56/00* (2009.01)
*H04W 72/12* (2009.01)
*H04W 84/04* (2009.01)

(52) U.S. Cl.
CPC ........... *H04W 56/00* (2013.01); *H04W 72/1289* (2013.01); *H04W 84/047* (2013.01)

(56) References Cited

U.S. PATENT DOCUMENTS

| | | | |
|---|---|---|---|
| 2008/0159217 A1* | 7/2008 | Chang et al. | 370/329 |
| 2008/0227386 A1 | 9/2008 | Dayal et al. | |
| 2009/0016256 A1 | 1/2009 | Kim et al. | |
| 2009/0059838 A1* | 3/2009 | Min et al. | 370/315 |
| 2010/0128642 A1* | 5/2010 | Bossler et al. | 370/280 |
| 2010/0157826 A1* | 6/2010 | Yu et al. | 370/252 |
| 2011/0306291 A1* | 12/2011 | Ma et al. | 455/9 |

FOREIGN PATENT DOCUMENTS

| | | |
|---|---|---|
| JP | 2009517918 A | 4/2009 |
| WO | WO-2007064249 A1 | 6/2007 |
| WO | WO-2008115826 A1 | 9/2008 |

OTHER PUBLICATIONS

Seo et al, U.S. Appl. No. 61/168209, filed Apr. 9, 2009.*
International Search Report and Written Opinion—PCT/US2010/031959—International Search Authority, European Patent Office, Feb. 4, 2011.
Motorola: "LTE-A Relay support via existing MBSFN signaling (10ms vs. 8ms periodicity)", 3GPP Draft; R1-084535_MBSFN 10MS VS 8MS Periodicity, 3rd Generation Partnership Project (3GPP), Mobile Competence Centre 650, Route des Lucioles ; F-06921 Sophia-Antipolis Cedex ; France, No. Prague, Czech Republic; 20081118, Nov. 18, 2008, XP050317784, [retrieved on Nov. 18, 2008].
Nortel: "More Design Aspects on Downlink Transparent Relay in LTE-A", 3GPP Draft; R1-083866(Nortel—Designaspect Transparent Relay)_V1, 3rd Generation Partnership Project (3GPP), Mobile Competence Centre ; 650, Route des Lucioles ; F-06921 Sophia-Antipolis Cedex ; France, No. Prague, Czech Republic; 20080924, Sep. 24, 2008, XP050317181, [retrieved on Sep. 24, 2008].
Alcatel-Lucent: "Best Companion" reporting for improved single-cell MU-MIMO pairing, 3GPP TSG-RAN WG1 #56bis Meeting R1-091307, Mar. 2009, pp. 1-5.
LG Electronics: "Consideration on DL-RS Design in LTE-Advanced", 3GPP TSG-RAN WG1 meeting #56bis R1-091187, Mar. 2009.
Taiwan Search Report—TW099112571—TIPO—Mar. 1, 2013.
China Potevio Co., Ltd, "Coordinated Transmission in Transparent Relay System," 3GPPTSG-RAN WG1#56,3GPP, Feb. 13, 2009,R1-090672, 6 Pgs.

* cited by examiner

PRE-COMMUNICATION FOR RELAY BASE STATIONS IN WIRELESS COMMUNICATION

CLAIM OF PRIORITY UNDER 35 U.S.C. §119

The present Application for Patent claims priority to Provisional Patent Application Ser. No. 61/171,387 entitled "METHODS AND APPARATUS TO ENABLE PRE COMMUNICATION FOR TRANSPARENT RELAYS, PICO CELLS, RRHs, AND SMART REPEATERS" and filed Apr. 21, 2009, assigned to the assignee hereof and hereby expressly incorporated by reference herein.

BACKGROUND

I. Field

The following description relates generally to wireless communications, and more particularly to facilitating pre-signaling supplemental wireless nodes to enhance wireless coverage in a network deployment.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, ... ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A recent technological advancement in wireless communication is the integration of relatively small, low power base stations or wireless access points within existing macro base station deployments. These low power base stations can be governed by a nearby macro base station, or can be treated as independent base stations by a wireless network. Typically, low power base stations can be deployed indoors, such as within a shopping mall, office building, apartment complex, etc., to provide targeted cellular coverage to a given building, or dispersed outdoors within poor coverage areas, for instance, to provide targeted cellular coverage for a particular geographic region. These base stations have multiple advantages for supplementing a macro deployment. First, small low power base stations are generally less expensive than full macro base stations, and can supplement a macro deployment at lower cost. Second, because these base stations typically transmit at much lower power and over shorter ranges, a supplemental deployment of low power base stations can be tailored to limit interference to a surrounding network.

Various types of supplemental or low power base stations exist. One common example is a relay node. A relay node refers to a base station-like entity that may or may not be coupled to a wired backhaul. Further, the relay node is generally a low power base station with small coverage area in relation to a typical 50 watt or similar macro base station. In addition, the relay node is typically subservient to and controlled by one or more donor macro base stations.

In operation, a relay node receives data over-the-air from a donor base station, and can forward that data to an access terminal (AT) served by the relay node (and by the donor base station). The relay node can forward the data to the AT utilizing the same wireless spectrum as the donor base station (an in-band relay), or can receive the data on a first spectrum and retransmit that data on a second spectrum (an out-of-band relay). The in-band relay is often a half duplex entity, that can either transmit or receive in a given time frame, but not both, whereas the out-of-band relay can often be full duplex, capable of simultaneous reception and transmission (on different frequency bands).

In addition to the general characteristics described above, several variations of relay nodes exist. For instance, a transparent relay node refers to a relay node that is not visible to, or is not recognized as a separate entity by, the AT. Rather, the transparent relay is indistinguishable from the donor base station, at least from the perspective of the AT. Transparent relays, therefore, typically just repeat cell identity information, acquisition and synchronization information, and so on, of the donor base station. One common function of the transparent relay is to boost transmit power of the donor base station. In some cases, the transparent relay can decode, filter, and then retransmit those signals, to provide a higher quality signal, as opposed to just providing an increase in signal amplitude. One particular relay, called an incremental redundancy relay (an IR relay), can monitor base station scheduling messages over-the-air, and identify data or control traffic intended for the AT. The IR relay can demodulate downlink data sent by the base station and can assist in subsequent hybrid automatic repeat request (HARQ) transmissions of the downlink data to the AT (e.g., if the AT indicates that a portion or all of the data is not received). Similarly, the IR relay can decode uplink data transmissions from an AT and can assist in subsequent HARQ transmissions of the uplink data. Because the IR relay generally observes a better signal to noise ratio (SNR) for this traffic than the AT, it can decode the traffic earlier and reduce timing for subsequent HARQ transmission (as compared with HARQ transmissions of a more distant base station).

Although relay nodes have several advantages, some drawbacks and design challenges do exist concerning integrating these entities into a macro deployment. For instance, half duplex nodes have fewer transmit and receive resources, due to the nature of half duplex operation. This tends to reduce efficacy of the relay node and can lower potential loading capabilities (e.g., how many ATs can be served concurrently). In addition, complexities arise in managing control signaling between the base station and relay node, or between the base station and ATs, since ATs are generally configured to look for certain control signals in particular time slots, some of which may not be available as transmission slots to a half duplex relay node. These and other challenges are the focus of current research in wireless networking.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides improvements for employing supplemental base stations or access points in a wireless communication environment. According to some disclosed aspects, prior signaling is employed between a macro base station and a set of associated supplemental base stations to support pending wireless communication with a user terminal. In some disclosed aspects, prior signaling can convey control or data traffic involving a user terminal between a macro and supplemental base station. Thus, the macro base station forwards the control or data traffic to the supplemental base station, which can reconfigure its own transmissions of the control or data traffic to be concurrent with the macro base station. Further, the supplemental base station can transmit a pilot signal on OFDM symbols employed by the macro base station for pilot signal transmission. In this manner, the macro base station and supplemental base station provide a consistent downlink channel as observed at the user terminal, for both control and data traffic, and for pilot signals. Accordingly, the user terminal can demodulate this downlink channel with a common reference signal, improving accuracy of downlink signal measurements and reducing receiver complexity at the user terminal.

In particular aspects, uplink or downlink signal measurements can be analyzed to identify a relative location of the user terminal. When the user terminal is deep within a coverage area of the macro base station or supplemental base station, joint transmission can be suspended, and resumed once this condition ends. In other aspects, the macro base station can send a subset of the control or data traffic for joint transmission by the supplemental base station. The subset can include select traffic streams, select subbands, time slots, or the like, on an uplink or a downlink. In these aspects, particular traffic streams or particular wireless resources can be enhanced by the supplemental base station.

In at least one aspect, the supplemental base station can comprise a half duplex wireless transceiver configured to alternate between transmission and reception on contiguous OFDM symbols of a signal time slot (e.g., a third generation partnership project long term evolution [3GPP LTE] subframe). For instance, the supplemental base station can be configured to receive a signal on at least one OFDM symbol of the signal time slot that is interposed in time between at least two non-contiguous OFDM symbols of the signal time slot employed for transmitting a pilot signal. In one aspect, the supplemental base station can transmit pilot signals in separate signal time slots as transmission or reception of control or data traffic. In other aspects, the supplemental base station can transmit pilot signals as well as control or data traffic together in at least one signal time slot. Accordingly, the supplemental base station can be a flexible entity that coordinates wireless activity with a controlling base station to provide a consistent downlink channel for wireless communication.

Further to the above, in one or more aspects, the subject disclosure provides a method for employing a half duplex supplemental wireless node (a HD-SWN) in wireless communication. The method can comprise transmitting a signal on a first set of orthogonal frequency division multiplex symbols (a first set of OFDM symbols) in a third generation partnership project long term evolution signal subframe (an LTE signal subframe). Moreover, the method can also comprise receiving a wireless signal on a second set of OFDM symbols within the LTE signal subframe, wherein at least one OFDM symbol of the second set of OFDM symbols is interposed in time between at least two OFDM symbols of the first set of OFDM symbols that are non-contiguous in time.

In other aspects, provided is an apparatus for wireless communication. The apparatus can comprise a half duplex wireless transceiver configured to transmit and receive signals on separate OFDM symbols of a long term evolution signal subframe (an LTE signal subframe). Furthermore, the apparatus can comprise a memory for storing instructions configured to cause the half duplex wireless transceiver to switch between transmitting and receiving on contiguous OFDM symbols. In addition, the modules for implementing the instructions can comprise an acquisition module that identifies a set of OFDM symbols employed by a network base station for pilot transmission, and a configuration module that causes the half duplex wireless transceiver to transmit a signal on a first OFDM symbol of the LTE signal subframe, receive a further signal on a second OFDM symbol of the LTE signal subframe, and re-transmit the signal on a third OFDM symbol, wherein the second OFDM symbol is interposed in time within the LTE signal subframe between the first OFDM symbol and the third OFDM symbol.

According to still other aspects, provided is an apparatus for wireless communication. The apparatus can comprise means for transmitting a signal on a first set of orthogonal frequency division multiplex symbols (a first set of OFDM symbols) in a third generation partnership project long term evolution signal subframe (an LTE signal subframe). Further, the apparatus can comprise means for receiving a wireless signal on a second set of OFDM symbols within the LTE signal subframe, wherein at least one OFDM symbol of the second set of OFDM symbols is interposed in time between at least two OFDM symbols of the first set of OFDM symbols that are non-contiguous in time.

According to another aspect, disclosed is at least one processor configured for employing a half duplex wireless transceiver in wireless communication. The processor(s) can comprise a module that causes the half duplex wireless transceiver to transmit a signal on a first set of orthogonal frequency division multiplex symbols (a first set of OFDM symbols) in a third generation partnership project long term evolution signal subframe (an LTE signal subframe). Moreover, the processor(s) can comprise a module that causes the half duplex wireless transceiver to receive a wireless signal on a second set of OFDM symbols within the LTE signal subframe, wherein at least one OFDM symbol of the second set of OFDM symbols is interposed in time between at least two OFDM symbols of the first set of OFDM symbols that are non-contiguous in time.

In an additional aspect, the subject disclosure provides a computer program product comprising a computer-readable medium. The computer-readable medium can comprise code for causing a computer to employ a half duplex wireless transceiver to transmit a signal on a first set of orthogonal frequency division multiplex symbols (a first set of OFDM symbols) in a third generation partnership project long term evolution signal subframe (an LTE signal subframe). Additionally, the computer-readable medium can comprise code for causing the computer to employ the half duplex wireless transceiver to receive a wireless signal on a second set of OFDM symbols within the LTE signal subframe, wherein at least one OFDM symbol of the second set of OFDM symbols is interposed in time between at least two OFDM symbols of the first set of OFDM symbols that are non-contiguous in time.

In addition to the foregoing, other aspects of the disclosure provide a method for wireless communication. The method can comprise sending control or data signaling information scheduled for a downlink transmission (a DL transmission) by a network base station to a remote wireless node associated with the network base station. Moreover, the method can comprise transmitting, on a single DL carrier, the DL transmission concurrent with a transmission of the control or data signaling information by the remote wireless node.

Additionally, another aspect of the subject disclosure provides an apparatus configured for wireless communication. The apparatus can comprise a communication interface configured for electronic communication with a base station and for wireless communication with a user equipment (a UE). The apparatus can also comprise a memory for storing instructions for coordinating wireless communications of the apparatus and the base station and a data processor for executing modules for implementing the instructions. More particularly, the modules can comprise a cooperation module that obtains at least a subset of traffic involving the UE and a signal time period for transmission or reception of the subset of traffic from the base station. Furthermore, the modules can comprise a communication module that employs the communication interface to transmit or receive the subset of traffic on a single carrier frequency concurrent with transmission or reception of the traffic by the base station.

Further aspects of the subject disclosure include an apparatus configured for wireless communication. The apparatus can comprise means for sending control or data signaling information scheduled for a DL transmission by a network base station to a remote wireless node over a backhaul network coupling the network base station and the remote wireless node. Additionally, the apparatus can comprise means for causing the network base station to transmit, on a single DL carrier, the DL transmission concurrent with a transmission of the control or data signaling information by the remote wireless node.

In additional aspects, disclosed is at least one processor configured for wireless communication. The processor(s) can comprise a module that sends control or data signaling information scheduled for a DL transmission by a network base station to a remote wireless node over a backhaul network coupling the network base station and the remote wireless node. The processor(s) can also comprise a module that causes the network base station to transmit, on a single DL carrier, the DL transmission concurrent with a transmission of the control or data signaling information by the remote wireless node.

In at least one additional aspect, the subject disclosure provides a computer program product comprising a computer-readable medium. The computer-readable medium can comprise code for causing a computer to send control or data signaling information scheduled for a downlink transmission (a DL transmission) by a network base station to a remote wireless node over a backhaul network coupling the network base station and the remote wireless node. Moreover, the computer-readable medium can also comprise code for causing the computer to initiate the DL transmission at the network base station on a single DL carrier, concurrent with a transmission of the control or data signaling information by the remote wireless node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
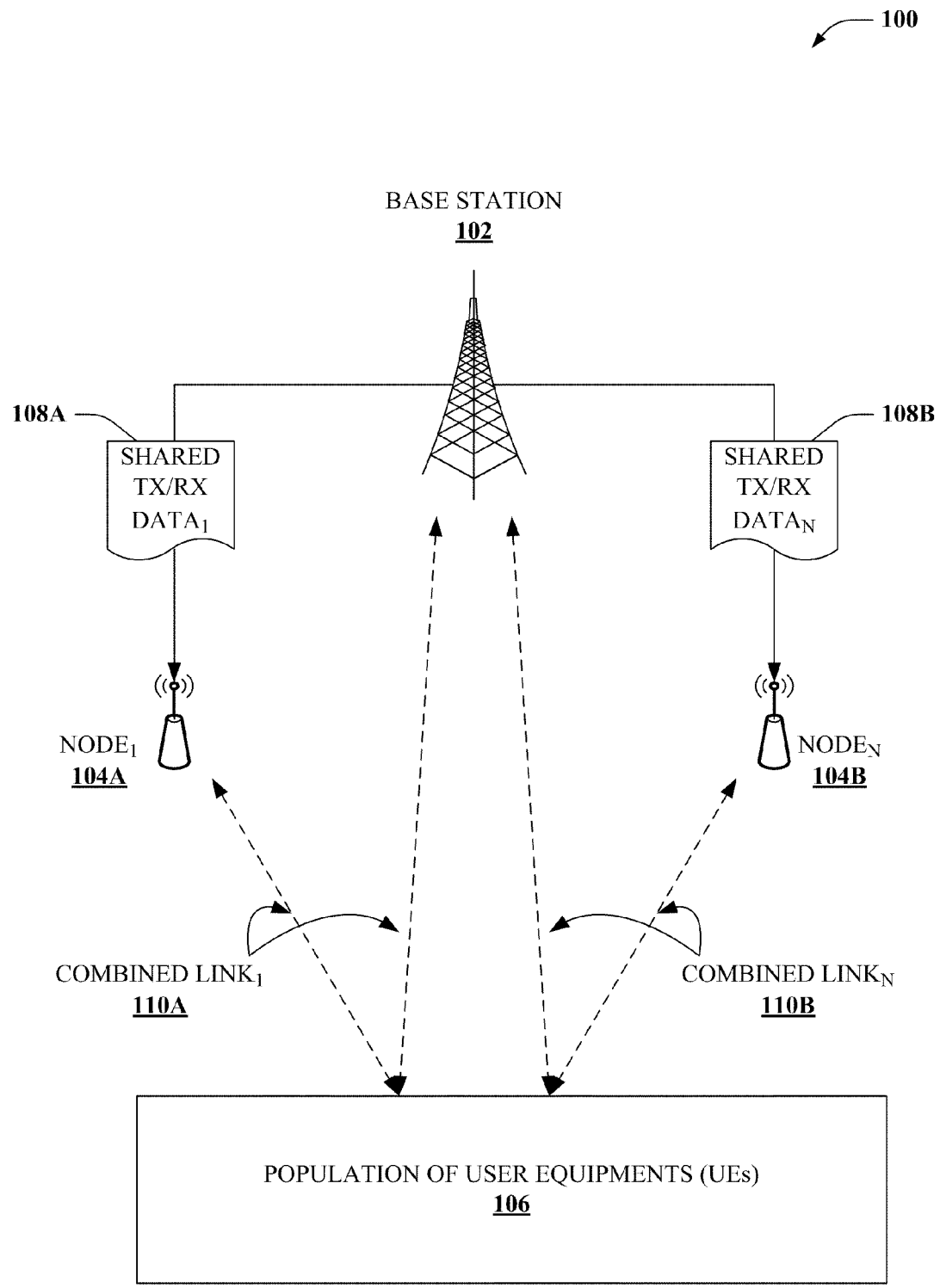
FIG. 1 illustrates a block diagram of an example wireless environment that employs prior signaling for supplemental base stations in disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of conducting prior signaling among for supplemental base stations to provide consistency for pilot transmissions as well as user traffic, among other things. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. In some cases, the infrastructure may employ a set of remote wireless nodes under control of a donor base station, to supplement wireless access coverage in a particular geographic area (e.g., a cell) served by the donor base station. This arrangement can provide multiple benefits. First, the remote wireless nodes can provide cost effective supplemental radio services in portions of the geographic area receiving poor coverage from the donor base station. Second, the remote wireless nodes can improve cell capacity in many circumstances. Third, the additional antennas of the wireless nodes can be utilized to achieve multi-antenna gains, similar to a MIMO antenna arrangement, or coordinated multipoint (CoMP) arrangement. Other benefits can include reduction of signal to noise ratio (SNR), improved performance at a cell boundary, reduced inter-cell or intra-cell interference, and so on.

A transparent relay is a particular type of supplemental wireless node that repeats a cell identifier, or other identifying indicia of a controlling macro base station. Generally, from a perspective of a user equipment (a UE), the transparent relay is indistinguishable from the macro base station itself. In implementation, the transparent relays can generate several design challenges.

One problem for transparent relays relates to half duplex operation. Although full duplex operation is more flexible, full duplex wireless nodes can be more expensive than half duplex. This results in at least some preference for half duplex wireless nodes, instead. However, half duplex nodes cannot transmit and receive signals on a single band concurrently. For a single carrier environment, therefore, the half duplex node has fewer resources to allocate to transmission and reception in a single time slot, or other transmission time slot (e.g., subslot). In conventional operation (e.g., third generation partnership project long term evolution [3GPP LTE], also referred to herein as LTE), a half duplex relay node does not re-transmit or repeat reference signals, pilot signals or acquisition/synchronization signals, etc., of a donor base station (e.g., a donor eNB) in all time slots that the donor base station transmits these signals. This can significantly disrupt channel measurements of UEs. Particularly, if one subset of time slots has just the donor eNB's signal, while another subset of time slots has both the repeated signal and the eNB's signal, time-averaging commonly used for channel measurements can be destroyed.

An additional challenge for transparent relays relates to UE feedback. Generally, distinct signals are received, analyzed and measured by the UE, and a report of such measurement is transmitted back to entities sending these signals. This enables a sending entity to adjust subsequent transmissions, including transmit power, beamshaping, etc., as well as re-transmitting lost data, and so on. However, since the transparent relay is conventionally indistinguishable from the macro base station, signal measurements conducted by the UE are of a combined base station/relay signal. Accordingly, signal-specific adjustments require additional processing complexity, if they can be conducted at all. Various aspects of the subject disclosure address these and other circumstances in wireless communications, as will be discussed in more detail below.

FIG. 1 illustrates a block diagram of an example wireless communication environment 100 according to one or more aspects of the subject disclosure. Wireless communication environment 100 involves wireless communication between several entities. Specifically, wireless communication environment 100 includes a macro base station (also referred to as simply a base station 102) communicatively coupled with a set of supplemental wireless nodes, including wireless node$_1$ 104A and wireless node$_N$ 104B, where N is a positive integer (collectively referred to as wireless nodes 104A-104B). Further, base station 102 can be communicatively coupled with a population of user equipments (or a set of user equipments [UEs]) 106 over one or more wireless links with respective UEs of the set of UEs 106, or respective sub-groups of the set of UEs 106 (e.g., where a sub-group of UEs can form a coordinated multipoint communication [CoMP] arrangement). In addition, one or more of wireless nodes 104A-104B can be communicatively coupled with one or more of the set of UEs 106.

Base station 102 is communicatively coupled with wireless nodes 104A-104B via a backhaul network (not depicted). The backhaul network enables two-way communication between base station 102 and wireless nodes 104A-104B. Further, this backhaul network can include a wired electronic link (e.g., Ethernet line, coaxial cable line, optical fiber line, and so on) or a wireless link (e.g., a carrier dedicated for base station to base station communication), or a suitable combination thereof.

Wireless nodes 104A-104B can provide various practical advantages for wireless communication environment 100. For instance, one or more of the wireless nodes 104A-104B can be positioned in a region where base station 102 has poor signal penetration. In this case, the wireless nodes 104A-104B can be employed to boost (or repeat) UL or DL signals between base station 102 and set of UEs 106, demodulate, filter and re-transmit a portion or all of the UL or DL signals, and so forth. In this example, wireless nodes 104A-104B can serve to increase an effective range of base station 102, reduce interference within a geographic region served by base station 102, improve signal quality, etc. Another advantage includes increased UE loading for the geographic region, since the additional transceivers provided by wireless nodes 104A-104B effectively increase a number of available wireless resources within the geographic region.

Several design constraints raise challenges for implementing wireless nodes 104A-104B. First, for a single carrier backhaul environment, wireless nodes 104A-104B will comprise half duplex wireless transceivers. This limits the respective nodes to either transmitting or receiving in particular signal time slots, but not both. Accordingly, where wireless nodes 104A-104B are employed to repeat pilot signals of base station 102, conventionally some pilot signal time slots will include a pilot of base station 102 only, whereas other time slots (those pilot signal time slots where one or more of wireless nodes 104A-104B is configured to transmit) will include a pilot of base station 102 as well as a pilot of one or more of wireless nodes 104A-104B. A UE observing joint pilot transmission in some time slots but not others can have difficulty obtaining accurate downlink (DL) signal measurements.

An additional challenge relates to UEs receiving and processing DL transmissions of base station 102 and wireless nodes 104A-104B. If wireless nodes 104A-104B are transparent nodes, respective UEs of the set of UEs 106 will generally identify any DL traffic signal from base station 102 or wireless nodes 104A-104B as originating at a single source. Without respective reference signals for each of the transmitters, however, a UE could have difficulty decoding respective DL signals, reducing wireless communication efficacy.

According to various aspects of the subject disclosure, base station 102 can transmit information to one or more of wireless nodes 104A-104B prior to broadcasting pilot transmissions or transmitting directed control or data information to the set of UEs 106. This prior transmission is also referred to herein as pre-communication, or prior signaling, or the like. The prior transmission can provide various benefits for wireless communication environment 100, but generally these benefits involve coordinating transmissions between base station 102 and one or more of wireless nodes 104A-104B to provide consistent DL channels for set of UEs 106. These coordinated transmissions result in one or more combined links, such as combined link.sub.1 110A involving base station 102 and wireless node.sub.1 104A and one or more of the set of UEs 106, and combined link.sub.N 110B involving base station 102, wireless node.sub.N 104B and at least one of the set of UEs 106 (referred to collectively as combined links 110A-110B). It should be appreciated that combined links 110A-110B can be combined in a DL, where transmissions of base station 102 and a wireless node are coordinated, combined in an UL, where receiver processing of base station 102 and a wireless node are coordinated, or both.

In some disclosed aspects, base station 102 transmits shared transmission or reception data to respective wireless nodes 104A-104B. This shared transmission or reception data can include different sets of data for respective nodes, such as shared transmission or reception data$_1$ 108A for wireless node$_1$ 104A, and shared transmission or reception data$_N$ 108B for wireless node$_N$ 104B (referred to collectively as shared transmission or reception data 108A-108B), or a common set of data for each node. In one aspect of the subject disclosure, shared transmission or reception data 108A-108B can comprise a wireless message that includes a set of wireless signal time slots on which base station 102 transmits a pilot signal. The term signal time slot, or transmission time slot or reception time slot, can refer to various time-based subdivisions of a wireless signal for different wireless access technologies employed by a wireless network. As one example, for a wireless network employing orthogonal frequency division multiplex (OFDM) access technology, the signal time slots can comprise one or more signal subframes, one or more OFDM symbols, one or more interlaces, and so on. It should be appreciated, however, that other suitable time-based subdivisions of a wireless signal can be consistent with the term signal time slot, and are considered part of the subject disclosure. The general term signal time slot should not be limited to any single interpretation except where required by context or explicitly mentioned.

This wireless message can be employed by one of the wireless nodes 104A-104B that is a half duplex supplemental wireless node (a HD-SWN), for synchronizing transmissions at least to the set of wireless signal subframes on which base station 102 transmits a pilot signal. In this manner, the set of UEs 106 will observe consistent joint pilot signals from base station 102 and at least the HD-SWN of wireless nodes 104A-104B, facilitating accurate decoding and signal measurements at the UEs.

As utilized herein, the term synchronizing refers to concurrent transmission of two or more signals by different transmitting entities or reception of a signal by two or more receiving entities. Thus, if base station 102 is configured to transmit a common reference signal on a set of OFDM symbols, a wireless node (e.g., wireless nodes 104A-104B) is synchronized to the base station when it also transmits the common reference signal on the same set of OFDM symbols. This applies to synchronized transmission of data traffic as well (or synchronized reception of data). Thus, as one particular example, base station 102 can send such a wireless message identifying OFDM symbols on which base station 102 transmits pilot signals to wireless node 104A. In another example, where the OFDM symbols on which base station 102 is pre-determined (e.g., specified within a network protocol or standard), wireless node 104A can be pre-loaded with the OFDM symbols in memory, or can receive a transmission identifying these OFDM symbols upon registering with a network associated with base station 102. In either case, wireless node 104A can employ these OFDM symbols and transmit its relay pilot on the same OFDM symbols as base station 102. In this manner, set of UEs 106 will consistently observe a pilot transmission that includes the base station pilot and relay pilot.

Figure 2:
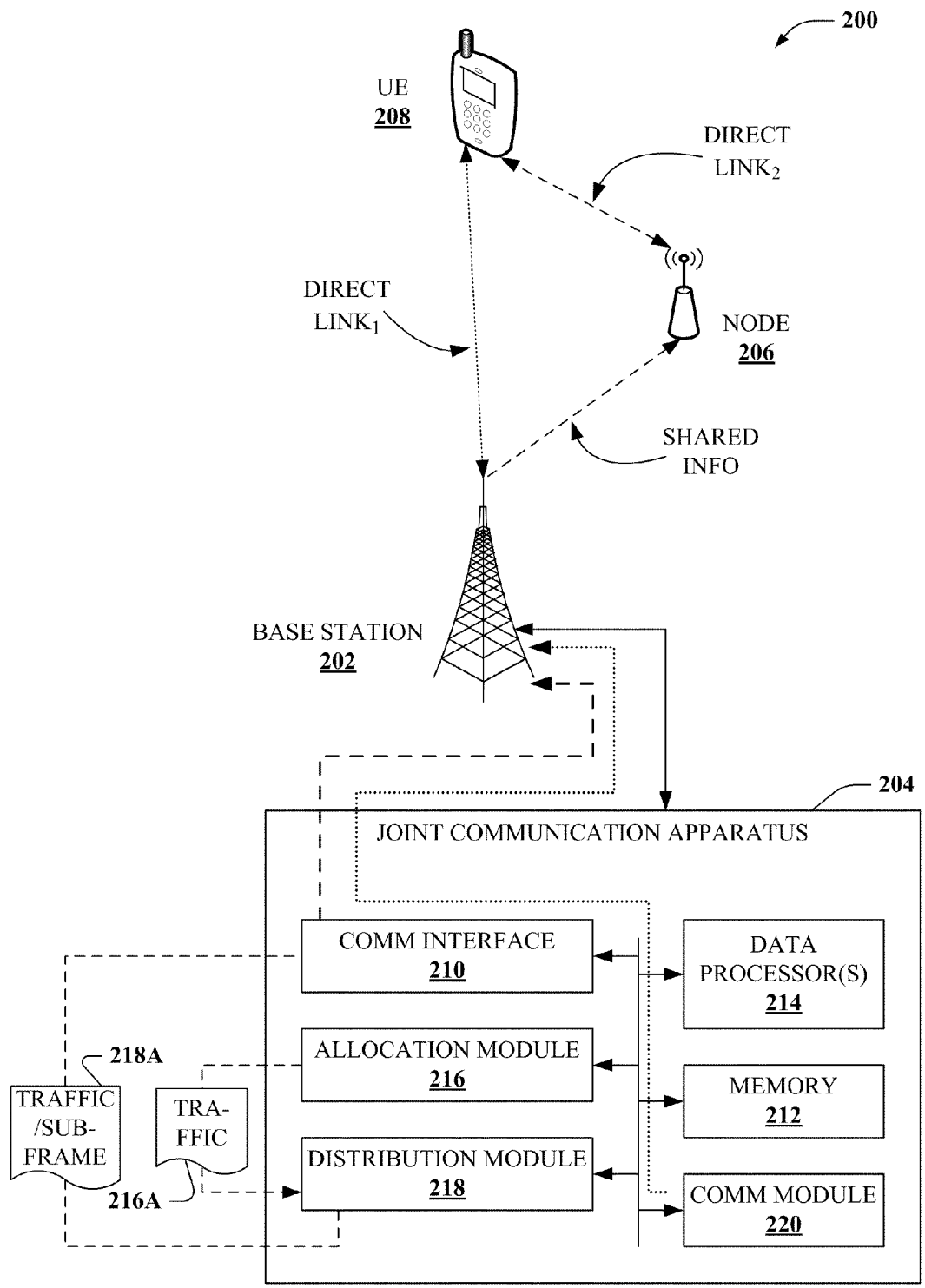
FIG. 2 depicts a block diagram of a sample wireless communication utilizing a joint communication apparatus according to further disclosed aspects.

Upon synchronizing relay pilot transmissions with base station 102, wireless node 104A can receive wireless signals on other OFDM symbols, other signal time slots (e.g., on another subframe, or another interlace), or the like. This joint transmission can be conducted for pilot signals as well as other control signals, or for data transmission involving set of UEs 106. For control and data traffic, base station 102 transmits traffic data to one or more of wireless nodes 104A-104B. The traffic data can include control or data signaling information scheduled for a DL transmission by base station 102 to one or more of the set of UEs 106. This traffic can then be scheduled for transmission concurrent with the DL transmission by base station 102. As a result, UEs of the set of UEs 106 that see transmissions of both base station 102 and one or more of the wireless nodes 104A-104B will obtain these respective transmissions concurrently, and can employ a common reference signal (a CRS) to decode the signals. Accordingly, in at least one aspect, the set of UEs 106 can accurately treat respective traffic signals as a single signal. In other aspects, base station 102 can determine whether a UE of the set of UEs 106 observes a particular base station as a preferred access point (e.g., where the UE is deep within a coverage range of that access point). If so, the traffic data can be transmitted (or received) exclusively by the preferred access point as long as the preferred access point condition exists (e.g., see FIG. 3, infra). FIG. 2 illustrates a block diagram of an example wireless communication system 200 according to further aspects of the subject disclosure. Wireless communication system 200 involves a controlling base station 202, which at least in part manages wireless communications of a remote wireless node 206. Remote wireless node is a supplemental base station associated with and serving the controlling base station 202, and can include a relay node, a pico cell, a repeater node, a transparent node, a transparent repeater, a transparent wireless relay, a transparent pico cell, a remote radio head, an incremental redundancy relay, or a smart repeater node, or a suitable combination thereof. In addition, controlling base station 202 and remote wireless node 206 are communicatively coupled with a UE via respective direct wireless links, as depicted.

Controlling base station 202 is coupled with a joint communication apparatus 204 that facilitates integration of UL or DL communication between controlling base station 202, remote wireless node 206, and UE 208. Particularly, joint communication apparatus 204 can facilitate coordinating transmission or reception of traffic data involving UE 208. In at least one aspect, the coordinating comprises concurrent transmission of control or signaling traffic, enabling UE 208 to decode the concurrent transmission with a CRS. Accordingly, UE 208 can treat the concurrent transmission as a single transmission from either controlling base station 202 or remote wireless node 206. This can help to facilitate supplemental wireless node deployments even to serve conventional UEs that are not configured to distinguish between multiple linked transmitters.

According to specific aspects of the subject disclosure, joint communication apparatus 204 can comprise a communication interface 210 configured for electronic communication with a remote wireless node (e.g., remote wireless node 206) and for wireless communication with a UE. Communication interface 210 can include a wireless transmit-receive chain of controlling base station 202 (e.g., see FIG. 12, infra), or alternatively can remotely control the transmit-receive chain of controlling base station 202 with signaled commands Communication interface 210 can further comprise an interface to a wired backhaul link coupling base station 202 and remote wireless node 206, or alternatively can control such interface by issuing suitable signaled commands to controlling base station 202 instead.

Joint communication apparatus 204 can further comprise a memory 212 for storing instructions for coordinating wireless communications of joint communication apparatus 204 and remote wireless node 206, and a data processor 214 for executing modules for implementing the instructions. Specifically, joint communication apparatus 204 can comprise an allocation module 216 that identifies traffic 216A involving UE 208 and allocates at least a subset of the traffic 216A for transmission or reception by remote wireless node 206. This subset of the traffic 216A is provided to a distribution module 218. Distribution module 218 identifies an applicable signal time period (e.g., a subframe, or set of subframes, a set of OFDM symbols, one or more OFDM symbols on a select set of subframes, or the like, or a suitable combination thereof), for transmission of the traffic by controlling base station 202. Distribution module 218 then employs communication interface 210 to share the subset of the traffic 216A and the signal time period for the transmission or reception with remote wireless node 206. The traffic and time period can be included in a bundled message 218A that is sent to remote wireless node 206 (as indicated by the dashed line from communication interface 210 to controlling base station 202 and remote wireless node 206).

Further to the above, joint communication apparatus 204 can comprise a communication module 220. Communication module 220 employs communication interface 210 to transmit or receive the traffic at joint communication apparatus 204 during the applicable signal time period. This enables transmission or reception of the traffic at controlling base station 202 to be concurrent with transmission or reception of the subset of the traffic 216A by remote wireless node 206. Accordingly, UE 208 can employ a CRS to decode the joint transmission, enabling UE 208 to treat two respective wireless links as a single link. In at least one aspect, the CRS can be supplied by joint communication apparatus 204 (e.g., see FIG. 3, infra). In other aspects, the CRS or symbols suitable for emulating the CRS can also be provided to remote wireless node 206, for instance to enable operation of a smart repeater that demodulates, filters and re-transmits information to UE 208.

Figure 3:
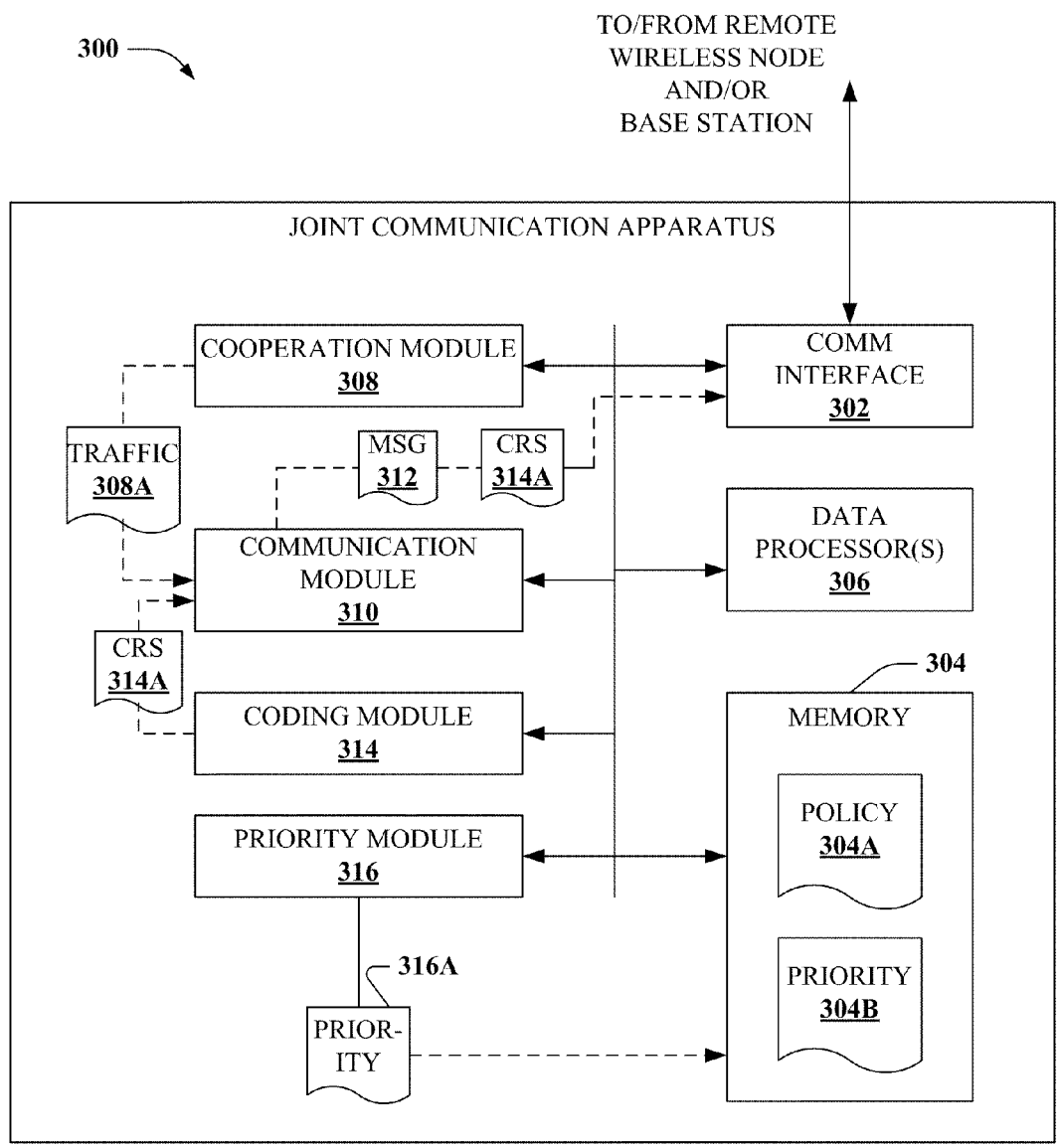
FIG. 3 illustrates a block diagram of an example joint communication apparatus according to particular aspects.

FIG. 3 illustrates a block diagram of an example joint communication apparatus 300 according to aspects of the subject disclosure. Joint communication apparatus 300 can be configured to provide synchronized communication for a set of wireless nodes coupled with a base station (not depicted, but see FIG. 1, supra). In at least one aspect, joint communication apparatus 300 can be substantially similar to joint communication apparatus 204, although the subject disclosure is not so limited. In other aspects, joint communication apparatus 300 can be coupled with a supplemental wireless node to synchronize downlink communication between the supplemental wireless node and a macro base station. This latter aspect is discussed in the description of joint communication apparatus 300, below, however it should be appreciated that the subject disclosure incorporates similar applications and features of joint communication apparatus 300 implemented at the macro base station, to achieve synchronized downlink communication of control or traffic data between the macro base station and supplemental wireless node Joint communication apparatus 300 can comprise a communication interface 302 configured for wired or wireless communication with a base station (e.g., the macro base station mentioned above), and with a UE. In some aspects, communication interface 302 can employ wired or wireless communication capabilities of the remote wireless node. Additionally, joint communication apparatus 300 can comprise memory for storing instructions for coordinating wireless communications of the remote wireless node and the base station, and a data processor that executes a set of modules for implementing the instructions.

Particularly, the set of modules can include a cooperation module 308 that obtains at least a subset of traffic involving a UE, and a signal time period (e.g., a transmission time slot, as defined herein, such as an LTE subframe or set of OFDM symbols within one or more such subframes) for transmission or reception of the subset of traffic, from the base station. Further, cooperation module 308 can provide a communication module 310 with at least the subset of the traffic 308A. Particularly, communication module 310 employs communication interface 302 to transmit or receive the subset of traffic (e.g., contained within a message 312 transmitted by communication module 310 to the UE, or received by communication module 310 from the UE) on a single carrier frequency concurrent with transmission or reception of the traffic by the base station. In one aspect, electronic communication with the remote wireless node involves transmitting the subset of the traffic 308A via a wired electronic communication over a wired backhaul link. In another aspect, the electronic communication involves transmitting the subset of the traffic 308A via a wireless electronic communication over a wireless backhaul link In another aspect, joint communication apparatus 300 can comprise a coding module 314 that generates a CRS for demodulating at least the subset of the traffic 308A. Coding module 314 can forward a second message 314A comprising the CRS to communication module 310, which in turn employs communication interface 302 to send second message 314A comprising the CRS to the UE. Particularly, communication module 310 transmits the CRS on a set of OFDM symbols employed by the base station for transmitting the CRS. In this manner, joint communication apparatus 300 can facilitate a consistent downlink channel for the UE, comprising a joint transmission of the CRS and at least the subset of the traffic by the base station and supplemental wireless node. In this manner, the UE does not observe joint transmission of the subset of the traffic, and independent transmissions of the pilot signal, which can result in an inconsistent downlink channel, and inaccurate downlink signal measurements at the UE (particularly where the UE averages downlink signal measurements across multiple signal time slots).

In further aspects, coding module 314 can be configured to be a module that employs communication interface 302 to receive from the base station a set of modulation symbols that can be employed for demodulating at least the subset of the traffic obtained by cooperation module 308. In one example, this set of modulation symbols comprises predetermined time-frequency symbols and predetermined values thereof that can be employed as a proxy for the CRS by the remote wireless node.

In a particular aspect of the subject disclosure, joint communication apparatus 300 can facilitate demodulating and receiving or re-transmitting portions of traffic involving the UE. This can be useful, for instance, where the supplemental base station coupled with joint communication apparatus 300 is a transparent incremental redundancy node. In this aspect, cooperation module 308 obtains a full set of traffic (or at least a superset of traffic, comprising the above subset of traffic) involving the UE from the base station. Furthermore, joint communication apparatus 300 can comprise a priority module 316 that executes instructions to extract the subset of traffic from the full set of traffic. Particularly, these instructions can include to reference an incremental redundancy policy 304A governing the remote wireless node, stored in memory 304. In addition, cooperation module 308 can be instructed to identify and distinguish the subset of the traffic 308A from a remainder of the full set of traffic based on the incremental redundancy policy 304A. This can comprise identifying and distinguishing a particular frequency subband, a particular type of traffic (e.g., control traffic or data traffic), a particular stream of traffic (e.g., associated with a particular application, or with a particular type of data traffic, such as web browsing traffic or voice traffic, etc.), or particular time-frequency resources, or the like, or a suitable combination thereof, to be allocated to the supplemental base station by the incremental redundancy policy 304A. Further, these instructions can cause priority module 316 to provide communication module 310 with the subset of the traffic for concurrent transmission or reception in conjunction with the base station at a signal time period specified for the traffic (also specified in the full set of traffic, or conveyed on an earlier communication between the base station and supplemental base station, as discussed at FIG. 2, supra, for instance).

According to another specific aspect of the subject disclosure, priority module 316 can further be configured as a module that employs UL or DL signal measurements of signals received by, or transmitted by, the UE. The signal measurements can be employed by priority module 316 to infer whether the UE is within a preferred range of either the base station or the supplemental base station (e.g., where the preferred range is deep within a coverage area of one or the other base station). In one instance, this inferred range is derived from a threshold signal characteristic based on the UL or DL signal measurements. In one exemplary instance, the threshold signal characteristic comprises a threshold signal quality, a threshold signal strength, or a threshold signal path loss characteristic, or the like, or a suitable combination thereof. If the UL or DL signal measurements indicate that the UE is indeed within a range that exceeds the threshold signal characteristic (the preferred range), priority module 316 can store a priority indication 316A identifying the base station or remote wireless node as a preferred access point in a priority file 304B of memory 304. Further, priority module 316 allocates at least a portion of subsequent traffic exclusively to either the base station or the remote wireless node. This exclusive allocation can persist until priority module 316 later determines that the UE is no longer within the range that exceeds the threshold signal characteristic (e.g., by comparing subsequent UL or DL signal measurements with the threshold signal characteristic), or that the UE is instead within a threshold signal characteristic range of a different access point. In the latter case, priority module 316 updates the priority indicator 316A stored in priority file 304B, and allocates at least a portion of subsequent traffic to the different access point.

Figure 4:
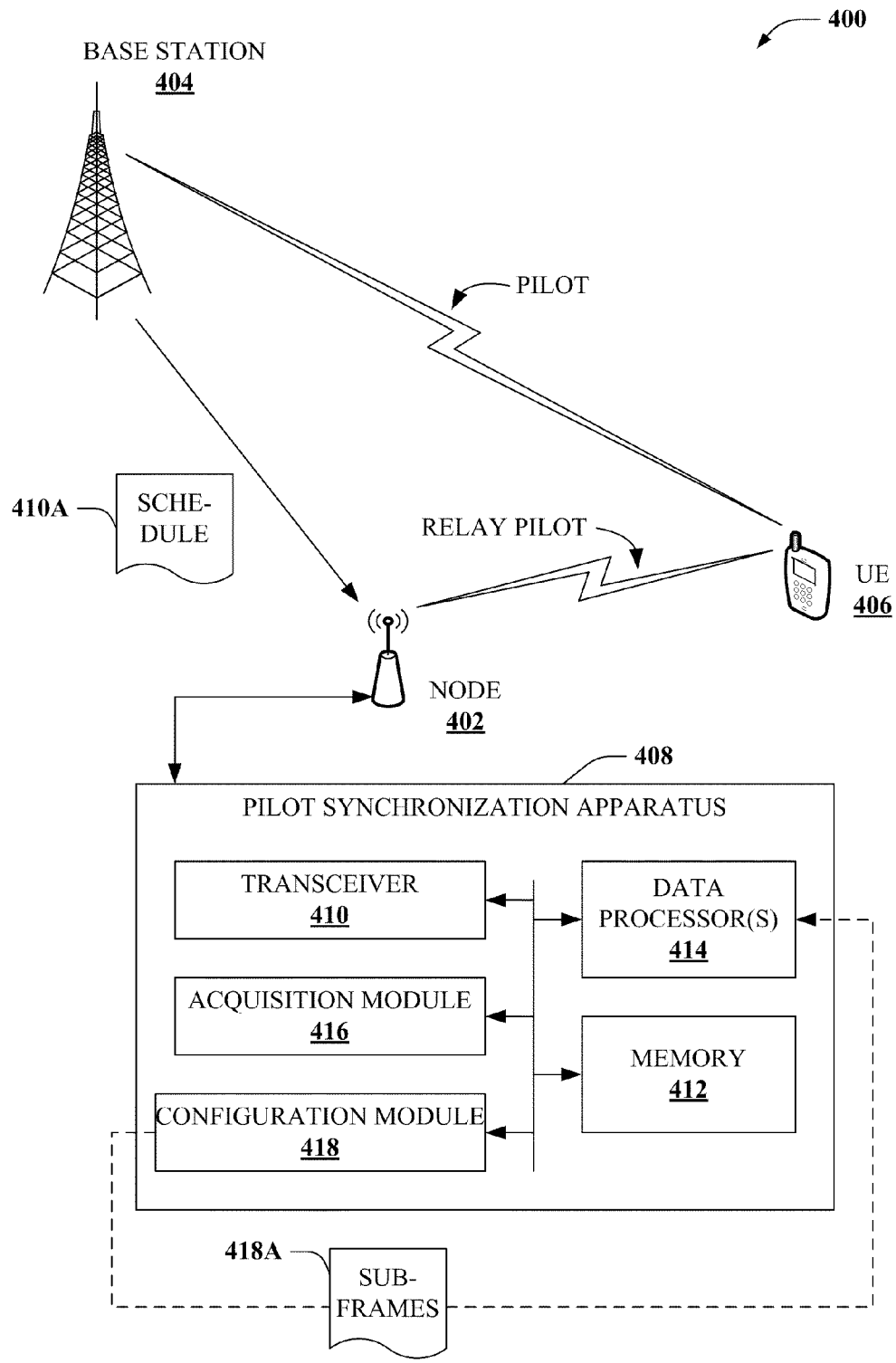
FIG. 4 illustrates a block diagram of a sample wireless communication with synchronized pilot transmissions of a macro and supplemental base station.

FIG. 4 illustrates a block diagram of another example wireless communication environment 400 according to other disclosed aspects. Wireless communication environment 400 includes a wireless node 402 that serves a network base station 404. Additionally, wireless node 402 and base station 404 are configured to engage in wireless communication with a UE 406. Wireless node 402 can comprise one or more characteristics of a supplemental wireless node, as described herein. For instance, wireless node can comprise a transparent repeater, a transparent wireless relay, a transparent pico cell, a remote radio head, a smart repeater, an incremental redundancy relay, or the like, or a suitable combination thereof.

Wireless node 402 is coupled with a pilot synchronization apparatus 408 configured to synchronize a relay pilot signal of wireless node 402 with an original pilot signal of base station 404. This synchronization can comprise transmission of the respective pilot signals on common transmission time slots (e.g., common OFDM symbols, common signal subframes, common signal subslots, etc.), so that UE 406 consistently observes a DL channel and a common reference signal that comprises both the relay pilot signal transmitted by wireless node 402, and the original pilot signal of base station 404. This synchronization can help UE 406 to obtain consistent pilot measurements, facilitating base station identification, wireless access, proper signal decoding, and the like.

Pilot synchronization apparatus 408 can comprise a half duplex wireless transceiver 410 (or an interface that employs a half duplex wireless transceiver of wireless node 402) configured for transmit and receive signals on separate OFDM symbols of a long term evolution signal subframe (an LTE signal subframe). Additionally, pilot synchronization apparatus 408 can comprise memory 412 for storing instructions configured to cause the half duplex wireless transceiver to switch between transmitting and receiving on contiguous OFDM symbols. These modules can comprise an acquisition module 416 that identifies a set of OFDM symbols employed by a network base station for pilot transmission. In one instance, the set of OFDM symbols can be pre-loaded in memory 412 of pilot synchronization apparatus 408 (or in memory of remote wireless node 402, which can comprise the same memory, or separate memory in various aspects). In another instance, the set of OFDM symbols can be specified by base station 404 in a pilot transmission schedule 410A.

Additionally, pilot synchronization apparatus 408 can comprise a configuration module 418 that causes the half duplex wireless transceiver to transmit a pilot signal on a first OFDM symbol of the LTE signal subframe, receive a signal on a second OFDM symbol of the LTE signal subframe, and re-transmit the pilot signal on a third OFDM symbol of the LTE signal subframe, wherein the second OFDM symbol is interposed in time within the LTE signal subframe between the first OFDM symbol and the third OFDM symbol. In one aspect, configuration module 418 causes half duplex wireless transceiver 410 to transmit the pilot signal on each OFDM symbol of the set of OFDM symbols. In a particular aspect, this pilot signal is a CRS, transmitted by wireless node 402 and base station 404 on the set of OFDM symbols. Accordingly, configuration module 418 can achieve synchronized communication of the CRS. Where this CRS is transmitted in conjunction with control or data traffic that is jointly transmitted by wireless node 402 and base station 404, a UE can obtain reliable measurements of the synchronized CRS transmission and the joint traffic transmission, and more readily employ the CRS to decode the traffic.

The following provides a particular example to illustrate a manner in which pilot synchronization apparatus 408 can be employed by wireless node 402, when acting as a supplemental base station that serves base station 404 (and UE 406). As one implementation, wireless node 402 can supplement data or control traffic of base station 404. The data or control traffic can be signaled from base station 404 to wireless node 402 prior to transmission thereof to UE 406. This can enable wireless node 402 to transmit the data or control traffic in addition to, or in lieu of, base station 404 (e.g., where UE 406 observes a preferable wireless connection at wireless node 402 as compared with base station 404). When transmitting traffic to UE 406 concurrently with base station 404, wireless node 402 will also transmit a common reference signal employed by base station 404. In order that UE 406 observes a similar downlink channel for pilot transmissions as is observed for traffic transmissions, wireless node 402 can employ pilot synchronization apparatus 408 to transmit the common reference signal in the same set of OFDM symbols as base station 404, as described herein. However, during these OFDM symbols, half duplex wireless transceiver 410 is unable to receive data from UE 406 or base station 404. Accordingly, pilot synchronization apparatus 408 receives signals on OFDM symbols other than those employed for transmission of the common reference signal, or transmission of traffic.

In practice, then, pilot synchronization apparatus 408 can cause half duplex wireless transceiver 410 to switch from transmit to receive on the first subset of signal time slots and the second subset of signal time slots, respectively. It should be appreciated that the first and second subset of signal time slots need not necessarily comprise consecutive time slots. Thus, where the first subset of signal time slots comprises OFDM symbols 0, 4, 7 and 8, in an LTE system for instance, the second subset of signal time slots can comprise OFDM symbols 1-3, 5, 6, and 9-13. In this case, half duplex wireless transceiver 410 will switch back and forth from transmit to receive at the appropriate OFDM symbols (or other suitable transmission time slots), to transmit on the first subset of signal time slots and receive on the second subset of signal time slots. In at least one aspect, pilot synchronization apparatus 408 can dynamically reconfigure transmit and receive timing of half duplex wireless transceiver 410 based on subsequent or periodic signaling of a pilot transmission schedule 410A, as is described in more detail at FIG. 5, infra.

Figure 5:
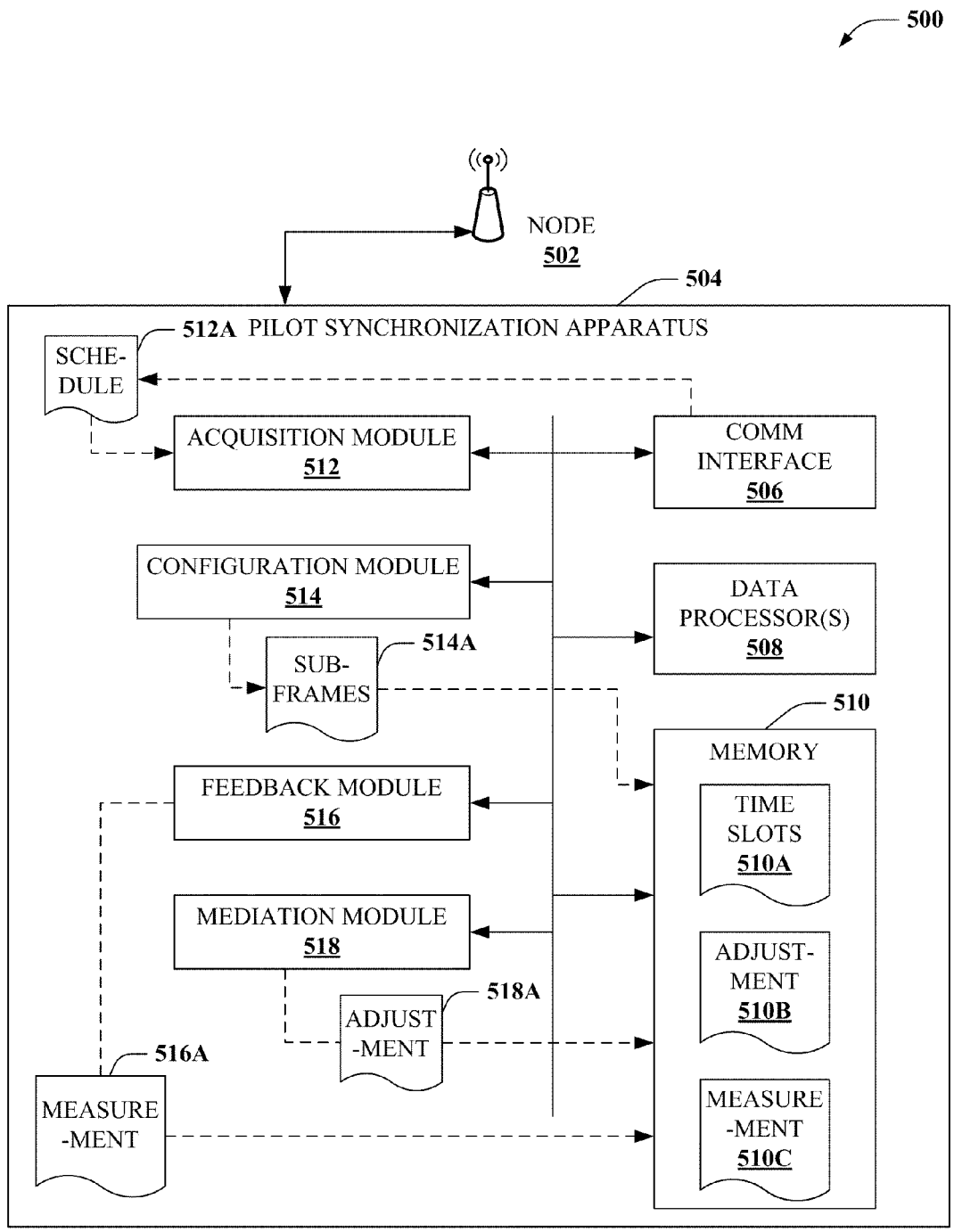
FIG. 5 depicts a block diagram of an exemplary pilot synchronization apparatus for providing concurrent pilot transmission according to further aspects.

FIG. 5 illustrates a block diagram of an example wireless system 500 according to one or more other aspects disclosed herein. Wireless system 500 comprises a supplemental wireless node 502 coupled with a pilot synchronization apparatus 504. Pilot synchronization apparatus 504 can be substantially similar to pilot synchronization apparatus 408 of FIG. 4, supra. However, the subject disclosure is not so limited, and pilot synchronization apparatus 504 can have some or all of the features and components of pilot synchronization apparatus 408, as well as other features and components described below.

Pilot synchronization apparatus 504 can comprise a communication interface 506 that is configured to communicate with, or control, a half duplex wireless transceiver of wireless node 502. The half duplex wireless transceiver is initially configured for receiving on a first subset of signal time slots, and for transmission on a second subset of signal time slots. These subsets of time slots may not necessarily coincide with that employed by an associated base station, however. As an example, for transmission of a pilot signal in an orthogonal frequency division multiplex (OFDM) LTE system, a set of OFDM symbols employed for pilot transmission comprises OFDM symbols 0, 4, 8 and 10 of an LTE signal subframe if a network base station transmits with a single or dual-antenna arrangement. Whereas for a quad-antenna arrangement, the set of OFDM symbols comprises OFDM symbols 0, 1, 4, 7, 8, and 10 of the LTE signal subframe if the network base station transmits with the quad-antenna arrangement. If wireless node 502 is not aware of the antenna arrangement, relay pilot transmission may be inconsistent with transmission of a base station pilot signal.

As discussed above with respect to pilot synchronization apparatus 408, pilot synchronization apparatus 504 can comprise memory 510 for storing instructions configured to supplement wireless communications of a network base station associated with wireless node 502, as well as a data processor 508 for executing modules that implement those instructions. Specifically, an acquisition module 512 can be executed to obtain or reference from memory 510 a schedule 512A of OFDM symbols employed by the network base station for transmitting a base station pilot signal. In one instance, schedule 512A specifies an antenna arrangement (e.g., single antenna, dual-antenna, quad-antenna, or other multi-antenna arrangement) employ for pilot signal transmission, and acquisition module 512 obtains the OFDM symbols employed by the network base station for the pilot signal transmission based on the antenna arrangement, from memory 510.

Once obtained by acquisition module 512, a configuration module 514 can utilize the schedule 512A to modify the second subset of signal time slots established for transmission by the half duplex wireless transceiver. A modified subset of signal time slots 514A is stored in a signal time slot file 510A in memory 510. Data processor 508 can employ the modified subset of signal time slots 514A to cause the half duplex wireless transceiver to transmit a relay pilot of wireless node 502 concurrent with the base station pilot signal. In at least one aspect, the base station pilot signal and the relay pilot signal can both comprise a CRS, which can be employed by a UE served by wireless node 502 to decode the pilot signals jointly.

In an additional aspect of the subject disclosure, pilot synchronization apparatus 504 can comprise a feedback module 516. Feedback module 516 obtains a channel report via communication interface 506 that contains a measurement of a base station pilot signal observed at the UE. In at least one instance, this measurement is of the base station pilot signal alone (e.g., prior to synchronization or transmission of the relay pilot signal). Feedback module 516 can store the channel report 516A in a measurement file 510C in memory 510, and further can forward the channel report 516A to the network base station. By analyzing the channel report 516A, the network base station can generate an estimation of a modulation and coding scheme (a MCS) suited for the UE to decode a relay pilot transmitted by the half duplex wireless transceiver. The MCS is transmitted to pilot synchronization apparatus 504, which can then transmit the relay pilot in accordance with the MCS.

Further to the above, pilot synchronization apparatus 504 can comprise a mediation module 518 that identifies a subset of OFDM symbols within an LTE signal subframe that are unavailable for transmission or reception by wireless node 502. This set of OFDM symbols can be a result of hardware time switching constraints of the half duplex wireless transceiver. In one instance, identification of the unavailable signal time slots can be established after configuration module 514 provides the modified subset of signal time slots 514A. Accordingly, the unavailable OFDM symbols can indicate transmission or reception constraints of the half duplex wireless transceiver after synchronization with the base station pilot signal. Mediation module 518 then adjusts transmission times of the pilot signal transmitted by the half duplex wireless transceiver such that the subset of OFDM symbols unavailable for transmission or reception does not coincide at least with the first OFDM symbol or the third OFDM symbol of the LTE signal subframe. An adjusted transmission time 518A can be stored in an adjustment file 510B of memory 510. Utilizing the adjusted transmission time 518A, data processor 508 can then mitigate a likelihood that hardware constraints of the half duplex wireless transceiver will affect synchronization of the relay pilot signal with the base station pilot signal. In one particular aspects, mediation module 518 modifies receive times of the half duplex wireless transceiver (e.g., the first subset of signal time slots) such that the subset of OFDM symbols does not coincide with the second OFDM symbol of the LTE signal subframe. In this manner, pilot synchronization apparatus can mitigate a likelihood that wireless node 502 is schedule to receive signals on OFDM symbols that are unavailable for transmission or reception. In this manner, mediation module 518 can fine-tune transmission and reception of wireless node 502.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a wireless communication system could include controlling base station 202 coupled with joint communication apparatus 204, remote wireless node 206 coupled with pilot synchronization apparatus 504, and UE 208, or a different combination of these or other entities. Sub-modules could also be implemented as modules communicatively coupled to other modules rather than included within parent modules. Additionally, it should be noted that one or more modules could be combined into a single module providing aggregate functionality. For instance, cooperation module 308 can include communication module 310, or vice versa, to facilitate obtaining a subset of traffic for relay signaling and transmitting or receiving the subset of traffic at a base station by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 6:
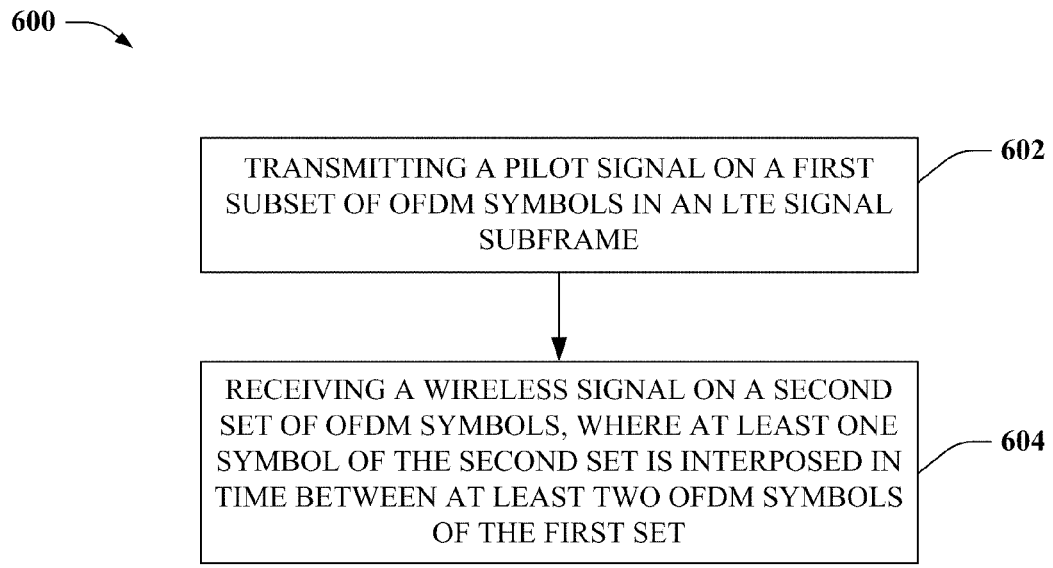
FIG. 6 illustrates a flowchart of a sample methodology for providing prior signaling to support supplemental base stations according to one or more other aspects.

FIG. 6 illustrates a flowchart of an example methodology 600 for employing a HD-SWN according to further aspects of the subject disclosure. At 602, method 600 can comprise transmitting a pilot signal on a first set of OFDM symbols in a 3GPP LTE signal subframe. At 604, method 600 can comprise receiving a wireless signal on a second set of OFDM symbols within the LTE signal subframe, wherein at least one OFDM symbol of the second set of OFDM symbols is interposed in time between at least two OFDM symbols of the first set of OFDM symbols that are non-contiguous in time. In at least one aspect, method 600 can comprise employing a CRS as the pilot signal, and employing OFDM symbols on which a controlling base station transmits a pilot signal (which can also be the CRS) for the first set of OFDM symbols, wherein the controlling base station is remotely located from the HD-SWN. In this manner, the HD-SWN and controlling base station can be configured to jointly transmit the CRS. This can be particularly useful where the HD-SWN and controlling base station are also jointly transmitting traffic to a UE, for instance. In this manner, the UE consistently observes joint transmissions of both the CRS and control or data traffic, rendering downlink signal measurements consistent at the UE.

Figure 7:
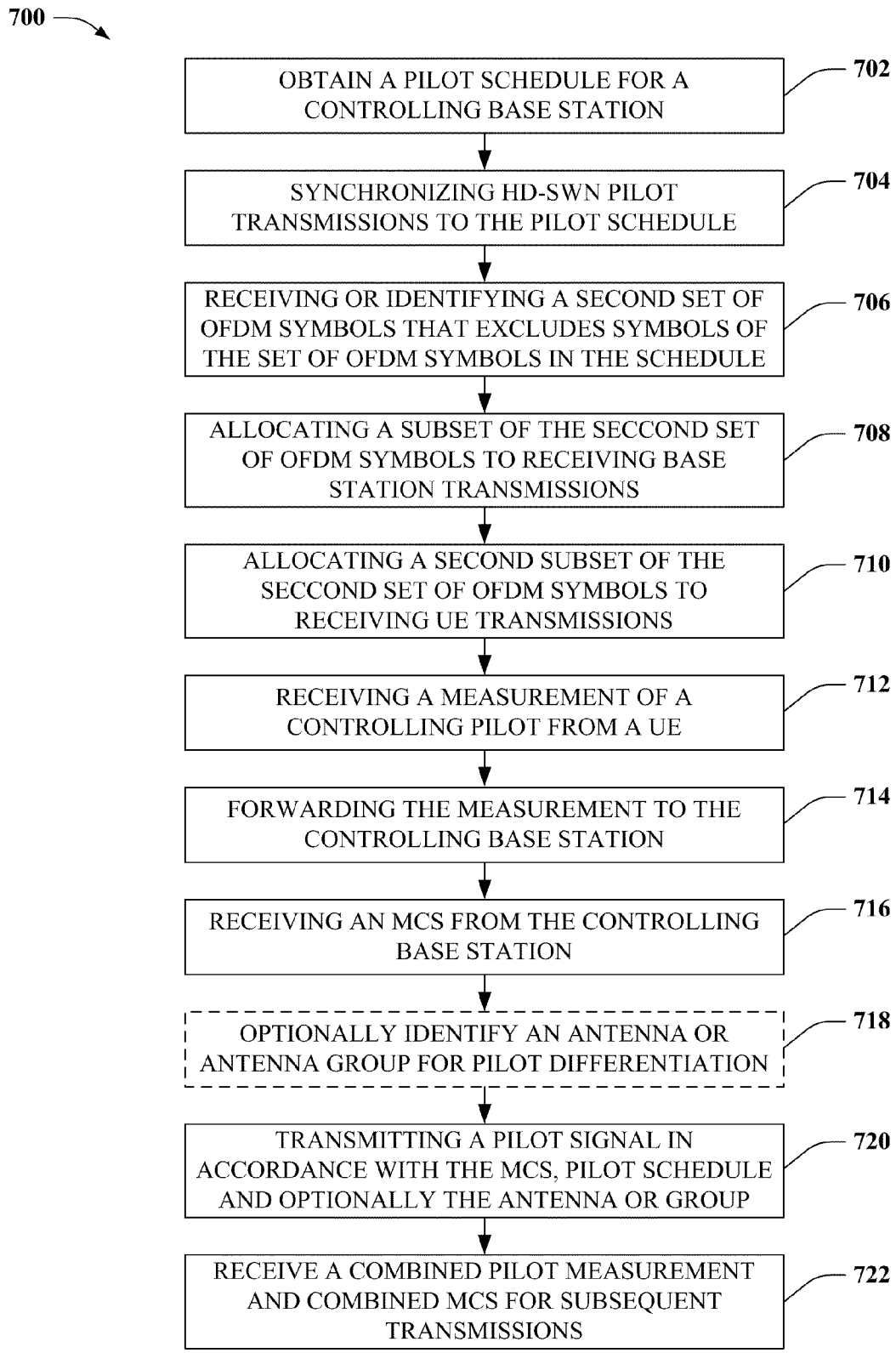
FIG. 7 depicts a flowchart of an example methodology providing consistent pilot transmissions among base stations serving a given coverage area.

FIG. 7 illustrates a flowchart of a sample methodology 700 according to still other aspects of the subject disclosure. At 702, method 700 can comprise obtaining a transmission schedule that comprises a set of OFDM symbols for transmission of a pilot signal of a controlling base station (a base station pilot signal). At 704, method 700 can comprise synchronizing pilot transmissions of a HD-SWN at least to the set of OFDM symbols. At 706, method 700 can comprise receiving or identifying a second set of OFDM symbols that excludes each OFDM symbol of the set of OFDM symbols. This can be employed to differentiate transmission and reception at the HD-SWN according to the set of OFDM symbols.

Further to the above, at 708, method 700 can comprise allocating a subset of the second set of OFDM symbols to receiving transmissions from the controlling base station. For this second set of OFDM symbols, the HD-SWN can be configured to receive base station transmissions over a wireless backhaul link between the HD-SWN and the controlling base station. Additionally, at 710, method 700 can comprise allocating a second subset of the second set of OFDM symbols to receiving transmissions from a UE that is wirelessly coupled with the HD-SWN. Accordingly, method 700 can establish a receive channel for the controlling base station as well as the UE, separate from the set of OFDM symbols employed by the HD-SWN for transmission.

At 712, method 700 can comprise obtaining a channel quality indicator (a CQI) or a precoding matrix indicator (a PMI) from the UE served by the HD-SWN, wherein the CQI or the PMI comprises a measurement of a controlling pilot signal transmitted by the controlling base station (a controlling pilot) and observed at the UE served by the HD-SWN. Further, at 714, method 700 can comprise forwarding the CQI or the PMI to the controlling base station to facilitate estimating a MCS for transmitting the pilot signal of the HD-SWN.

At 716, method 700 can additionally comprise receiving the MCS from the controlling base station. At 718, method 700 can optionally comprise identifying or receiving an antenna, virtual antenna port, or antenna-group assignment for differentiation of the controlling pilot and the pilot signal. At 720, method 700 can comprise transmitting the pilot signal in accordance with the MCS and the pilot schedule, and optionally can further comprise facilitating differentiation of a concurrent transmission of the controlling pilot and the pilot signal by employing a different antenna or antenna-group for the pilot signal than the controlling pilot is transmitted on, or alternatively, by employing a different virtual antenna port for the pilot signal than the controlling pilot is transmitted on, per the antenna, virtual antenna port or antenna-group assignment. At 722, method 700 can comprise receiving a second CQI or a second PMI that comprises a measurement of a concurrent transmission of the controlling pilot and the pilot signal as observed at the UE. This second CQI or second PMI can be forwarded to the controlling base station. In such case, method 700 can additionally comprise receiving an updated MCS from the controlling base station that is configured for the concurrent transmission of the controlling pilot and the pilot signal, and transmitting the pilot signal in a subsequent LTE signal subframe in accordance with the updated MCS.

Figure 8:
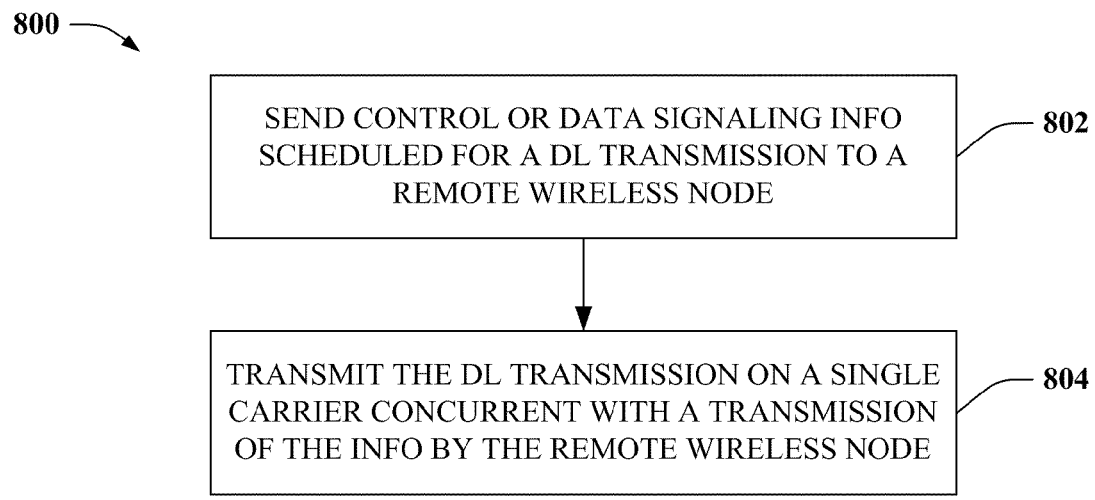
FIG. 8 illustrates a flowchart of an exemplary methodology providing prior signaling for user equipment traffic according to additional aspects.

FIG. 8 depicts a flowchart of a sample methodology 800 according to another aspect of the subject disclosure. At 802, method 800 can comprise sending control or data signaling information scheduled for a DL transmission by a network base station to a remote wireless node associated with the network base station. Additionally, at 804, method 800 can comprise transmitting, on a single DL carrier, the DL transmission concurrent with a transmission of the control or data signaling information by the remote wireless node. This concurrent transmission can also comprise a CRS which can be employed by a receiving UE to decode the DL transmission and the transmission of the control or data signaling information by the remote wireless node as a single signal. Further, this concurrent transmission can assist UEs that are not configured to differentiate transmissions of the network base station from transmissions of the remote wireless node in receiving and demodulating the control or data signaling information. Accordingly, the network base station can involve a transparent wireless node in supplemental wireless communication, even for conventional UEs that cannot separately distinguish the transparent wireless node.

Figure 9:
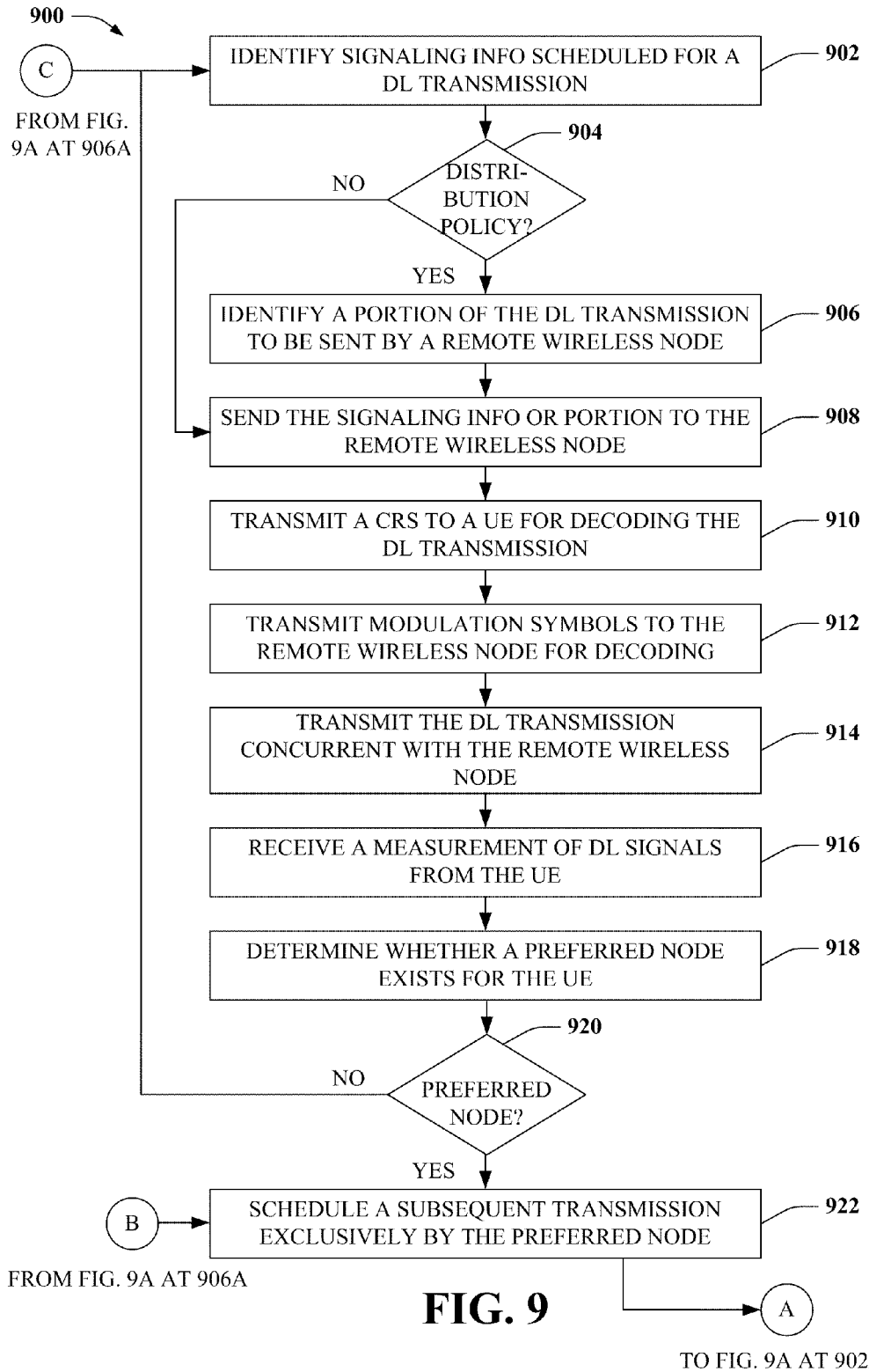
FIGS. 9 and 9A depict a flowchart of a sample methodology facilitating improved traffic coverage via supplemental base stations according to still other aspects.
Figure 9A:
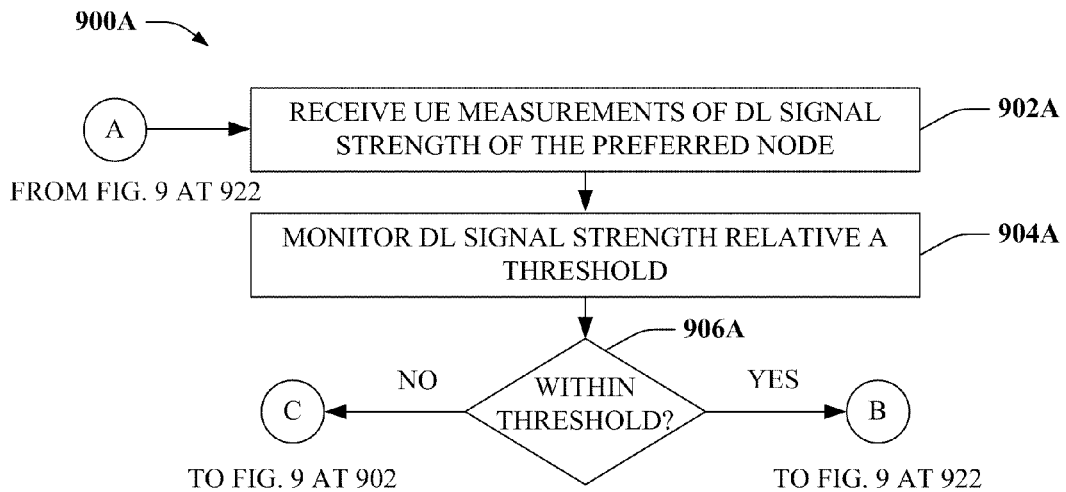

FIGS. 9 and 9A depict a flowchart of an example methodology 900, 900A according to particular aspects of the subject disclosure. At 902, method 900 can comprise identifying control or data signaling information scheduled for a DL transmission by a network base station. The control or data signaling information for the DL transmission can comprise, for instance, acknowledgment (ACK), or negative ACK (HACK) information, CQI information, a request message, a downlink signal (a DL signal) comprising downlink data traffic, an uplink signal (an UL signal) comprising uplink data traffic, or other suitable control or data traffic, or a suitable combination thereof.

At 904, a determination is made as to whether a distribution policy is associated with the DL transmission. This determination can comprise, for instance, referencing a distribution policy that allocates a portion of the control or signaling information or a subset of assigned resources involving a set of UEs to a remote wireless node. Allocation by the distribution policy can be based on various wireless characteristics, UE loading, UE scheduling, or the like. In at least one aspect, the distribution policy allocates the portion of the control or signaling information or the subset of the assigned resources to the remote wireless node based at least in part on scheduling for the set of UEs, UL signal strength measurements, or DL signal strength measurements, or a suitable combination thereof. If the distribution policy does relate to the DL transmission, method 900 can proceed to 906. Otherwise, method 900 proceeds to 908.

At 906, method 900 can comprise identifying and differentiating the portion of control or signaling information or the subset of assigned resources allocated to the remote wireless node according to the distribution policy. At 908, method 900 can comprise sending the control or data signaling information for the DL transmission to the remote wireless node. Alternatively, if the distribution policy is associated with the DL transmission, sending the control or data signaling information for the DL transmission to the remote wireless node comprises sending only the portion of the control or signaling information, or specifying the subset of assigned resources, that are allocated to the remote wireless node by the distribution policy. In either case, sending control or data signaling information can further comprise employing a wired or wireless backhaul network communicatively coupling the network base station and the remote wireless node to transmit the control or data signaling information (or portion thereof) to the remote wireless node.

At 910, method 900 can comprise transmitting a CRS to a set of UEs, wherein the set of UEs employ the CRS for decoding the DL transmission and the control or data signaling information to be transmitted by the network base station and the remote wireless node, respectively. At 912, method 900 can comprise transmitting to the remote wireless node a set of modulation symbols for decoding the control or signaling information, wherein the remote wireless node employs the set of modulation symbols as a reference signal to demodulate at least a portion of the control or signaling information (or identify the specified subset of assigned resources). This demodulation can be prior to transmitting the control or signaling information concurrent with the DL transmission.

At 914, method 900 can comprise transmitting, on a single frequency DL carrier, the DL transmission concurrent with a transmission of the control or data signaling information or portion thereof by the remote wireless node. At 916, method 900 can comprise receiving a measurement of DL signals from at least one of the set of UEs. At 918, method 900 can comprise determining whether a preferred node exists for the at least one of the set of UEs. In one example, the determination can comprise identifying at least one of the set of UEs that observes a preferred DL signal from either the remote wireless node or the network base station. In a particular aspect of this example, the determination can comprise identifying the preferred DL signal by receiving respective DL signal measurements of the network base station and the remote wireless node from the at least one of the set of UEs, and comparing the respective DL signal measurements to a preference threshold based on signal strength, signal quality or signal path loss, or a suitable combination thereof. In an alternative example, the determination can instead comprise measuring an UL signal from the at least one of the set of UEs, receiving a commensurate measurement of the UL signal from the remote wireless node, identifying a preferred wireless node for the at least one of the set of UEs by comparing a measurement of the UL signal at the network base station and the commensurate measurement to a threshold value. If a preferred node is identified for the at least one of the set of UEs, method 900 can proceed to 922; otherwise method 900 returns to reference number 902.

At 922, method 900 can comprise scheduling a second set of control or data signaling information for transmission to the at least one of the set of UEs exclusively via the remote wireless node or the network base station, whichever is the source of the preferred DL signal. From reference number 922, method 900 proceeds to FIG. 9A and method 900A.

At 902A, method 900A can comprise receiving DL signal measurements from the at least one of the set of UEs pertaining to the preferred DL signal. At 904A, method 900A can comprise monitoring the preferred DL signal relative to a signal strength or signal quality threshold. At 906A, method 900A can determine whether the preferred DL signal strength is within the signal strength or signal quality threshold. If so, method 900A returns to method 900 at 922; otherwise, method 900A returns to method 900 at reference number 902.

Figure 10:
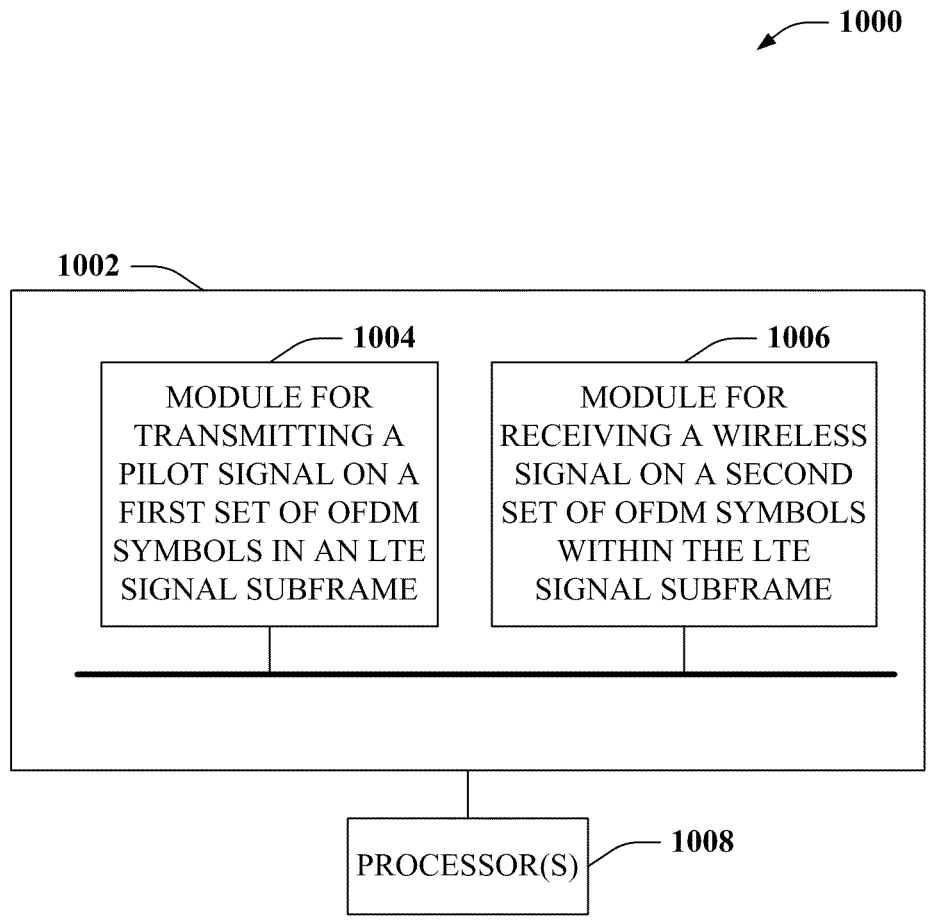
FIGS. 10 and 11 depict block diagrams of example electronic devices configured for prior signaling to support wireless communications.
Figure 11:
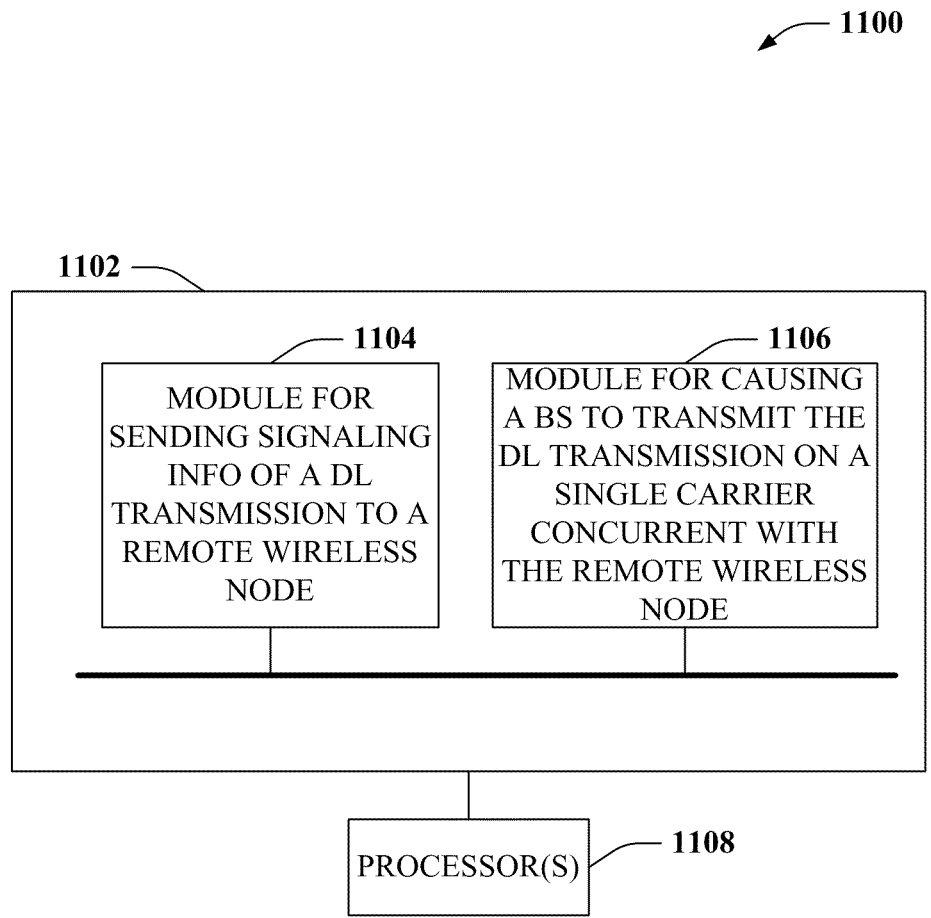

FIGS. 10 and 11 illustrate respective example apparatuses 1000, 1100 configured to facilitate wireless communication involving one or more supplemental wireless nodes, according to aspects of the subject disclosure. For instance, apparatuses 1000, 1100 can reside at least partially within a wireless communication network and/or within a wireless receiver such as a node, base station, access point, user terminal, personal computer coupled with a mobile interface card, or the like. It is to be appreciated that apparatuses 1000, 1100 are represented as including functional blocks, which can be functional blocks that represent functions implemented by a processor, software, or combination thereof (e.g., firmware).

Apparatus 1000 can comprise memory 1002 for storing instructions configured to execute functions of apparatus 1000, and a processor 1008 for executing modules that implement those instructions. Apparatus 1000 can further comprise a module 1004 for transmitting a pilot signal on a first set of OFDM symbols in an LTE signal subframe. Module 1004 can obtain this first set of OFDM symbols from a network base station (not depicted) associated with apparatus 1000, or can obtain the first set of OFDM symbols from memory 1002. In at least one aspect, module 1004 can receive a transmission arrangement of the network base station that employs different OFDM symbols for pilot transmission based on variations of the transmission arrangement (e.g., number of antennas) and reference memory 1002 to obtain the first set of OFDM symbols as a function of the transmission arrangement. Further to the above, apparatus 1000 can comprise a module 1006 for receiving a wireless signal on a second set of OFDM symbols within the LTE signal subframe. Particularly, this second set of OFDM symbols comprises at least one OFDM symbol that is interposed in time between at least two OFDM symbols of the first set of OFDM symbols (that are non-contiguous in time). As one example, a data processor 1008 can cause a half duplex wireless transceiver of apparatus 1000 to transmit and to receive on various OFDM symbols within the LTE signal subframe, per the first set of OFDM symbols and the second set of OFDM symbols. As a result, apparatus 1000 can change from transmission to reception multiple times on consecutive OFDM symbols, providing a flexible and responsive wireless transceiver for supplementing wireless communication of the network base station. In one instance, the half duplex wireless transceiver is integrated with apparatus 1000. In another instance, however, the half duplex wireless transceiver can be integrated with another entity (e.g., a supplemental base station or other suitable supplemental wireless node) that is communicatively coupled with apparatus 1000.

Apparatus 1100 can also comprise memory 1102 for storing instructions that facilitate features of apparatus 1100, and a processor 1108 for executing modules that implement those instructions. Particularly, apparatus 1100 can comprise a module 1104 for sending control or data signaling information scheduled for a DL transmission by a network base station (not depicted) to a remote wireless node over a backhaul network coupling the network base station and the remote wireless node. Additionally, apparatus 1100 can comprise a module 1106 for causing the network base station to transmit, on a single DL carrier, the DL transmission concurrent with a transmission of the control or signaling information by the remote wireless node, as described herein. It is of note that this concurrent transmission can generally be decoded using a CRS, and as a result conventional UEs receiving both the DL transmission and the transmission of the control or signaling information can decode the transmissions as a common signal.

Figure 12:
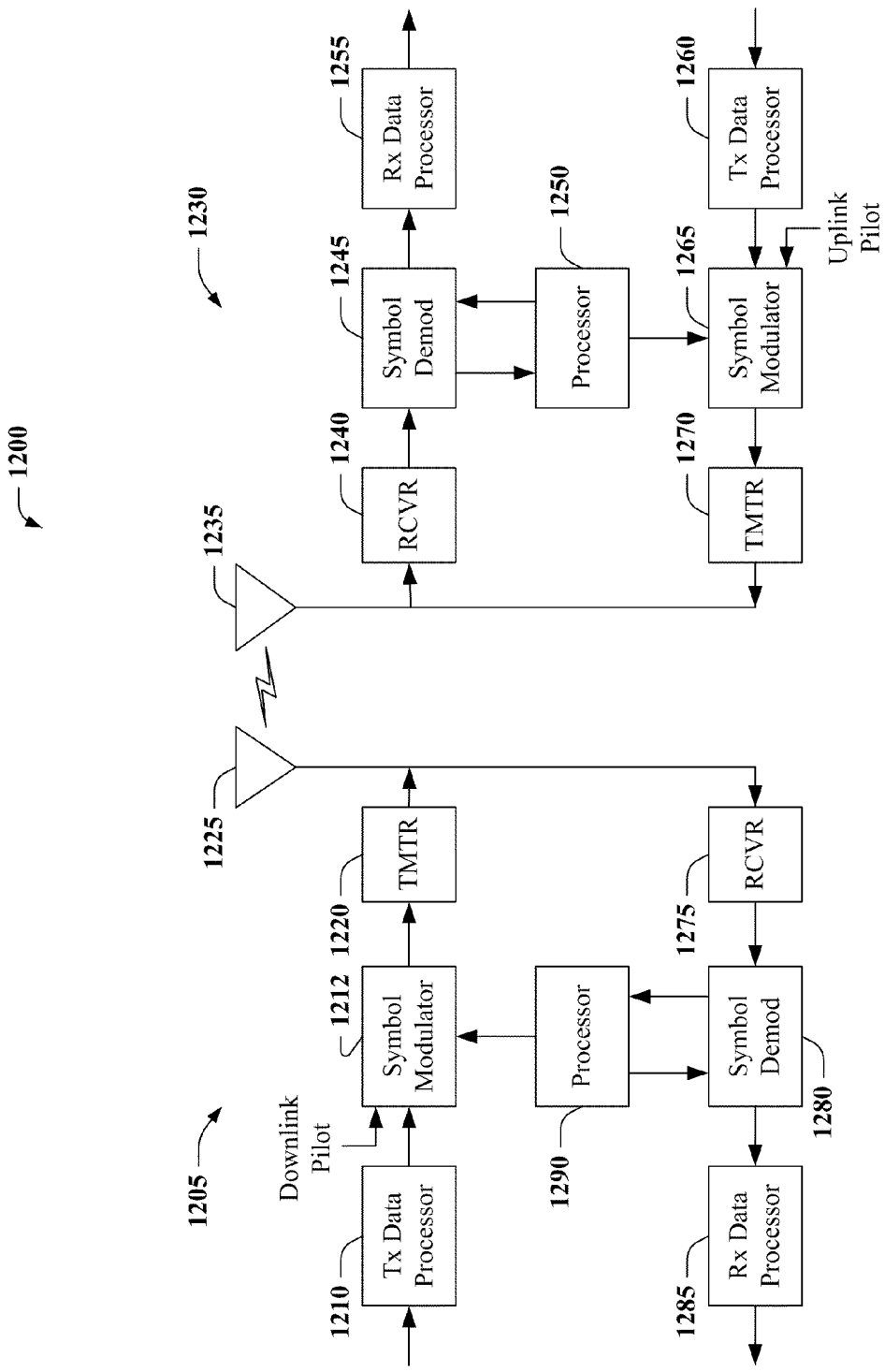
FIG. 12 depicts a block diagram of a sample wireless communications apparatus that can implement various aspects of the subject disclosure.

FIG. 12 depicts a block diagram of an example system 1200 that can facilitate wireless communication according to some aspects disclosed herein. On a DL, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1212 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1220 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1225 to the terminals. At terminal 1230, an antenna 1235 receives the DL signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the DL from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the UL, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an UL signal, which is transmitted by the antenna 1235 to the access point 1205.

At access point 1205, the UL signal from terminal 1230 is received by the antenna 1225 and processed by a receiver unit 1275 to obtain samples. A symbol demodulator 1280 then processes the samples and provides received pilot symbols and data symbol estimates for the UL. An RX data processor 1285 processes the data symbol estimates to recover the traffic data transmitted by terminal 1230. A processor 1290 performs channel estimation for each active terminal transmitting on the UL. Multiple terminals can transmit pilot concurrently on the UL on their respective assigned sets of pilot sub-bands, where the pilot sub-band sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1290 and 1250.

Figure 13:
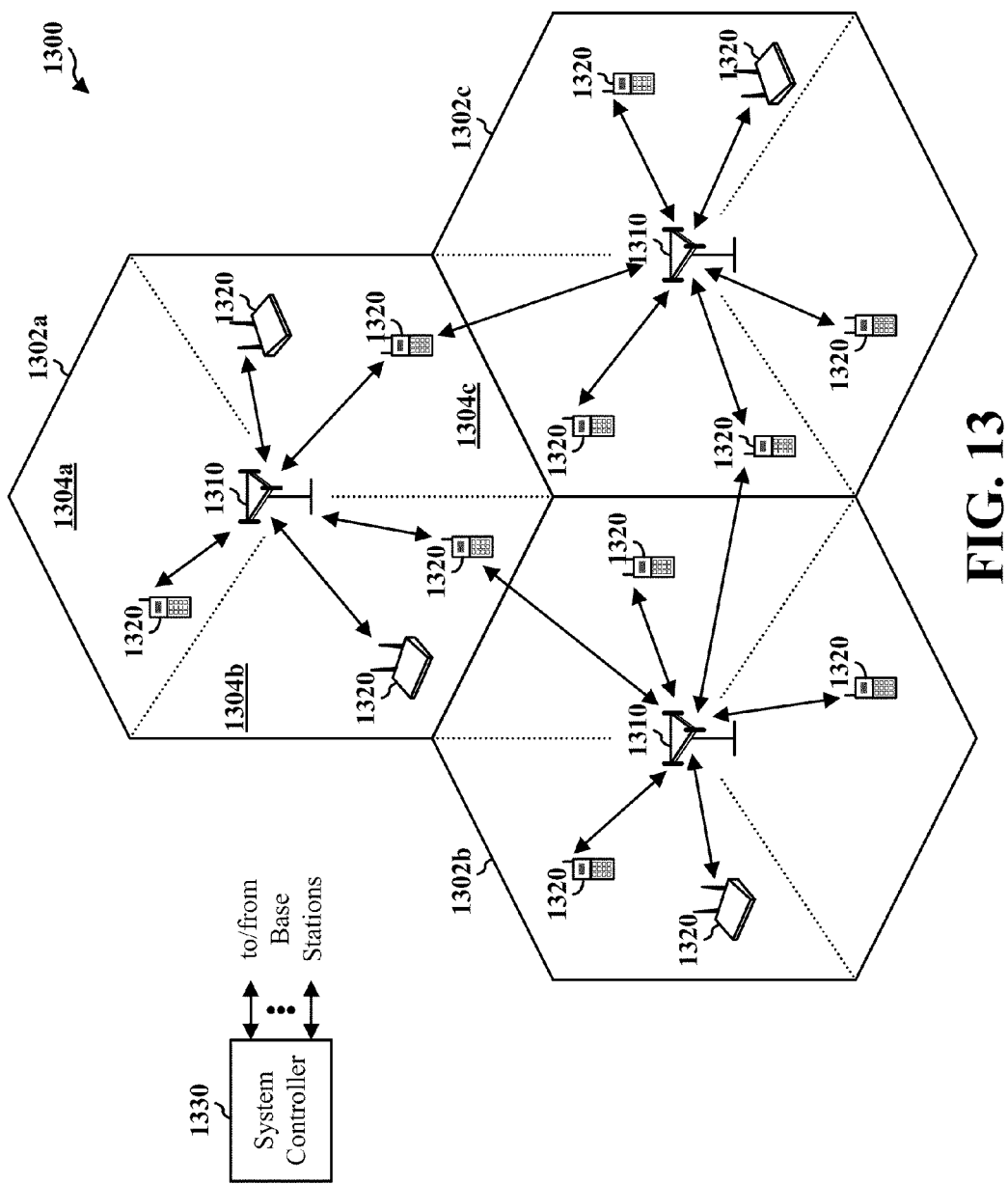
FIG. 13 illustrates a block diagram of a sample cellular environment for wireless communications according to further aspects.

FIG. 13 illustrates a wireless communication system 1300 with multiple base stations 1310 (e.g., wireless access points, wireless communication apparatus) and multiple terminals 1320 (e.g., ATs), such as can be utilized in conjunction with one or more aspects. A base station 1310 is generally a fixed station that communicates with the terminals and can also be called an access point, a Node B, or some other terminology. Each base station 1310 provides communication coverage for a particular geographic area or coverage area, illustrated as three geographic areas in FIG. 13, labeled 1302a, 1302b, and 1302c. The term "cell" can refer to a base station or its coverage area depending on the context in which the term is used. To improve system capacity, a base station geographic area/coverage area can be partitioned into multiple smaller areas (e.g., three smaller areas, according to cell 1302a in FIG. 13), 1304a, 1304b, and 1304c. Each smaller area (1304a, 1304b, 1304c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1320 are typically dispersed throughout the system, and each terminal 1320 can be fixed or mobile. Terminals 1320 can also be called a mobile station, user equipment, a user device, wireless communication apparatus, an access terminal, a user terminal or some other terminology. A terminal 1320 can be a wireless device, a cellular phone, a personal digital assistant (PDA), a wireless modem card, and so on. Each terminal 1320 can communicate with zero, one, or multiple BSs 1310 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1330 couples to base stations 1310 and provides coordination and control for base stations 1310. For a distributed architecture, base stations 1310 can communicate with one another as needed (e.g., by way of a wired or wireless backhaul network communicatively coupling the base stations 1310). Data transmission on the forward link often occurs from one access point to one access terminal at or near the maximum data rate that can be supported by the forward link or the communication system. Additional channels of the forward link (e.g., control channel) can be transmitted from multiple access points to one access terminal Reverse link data communication can occur from one access terminal to one or more access points.

Figure 14:
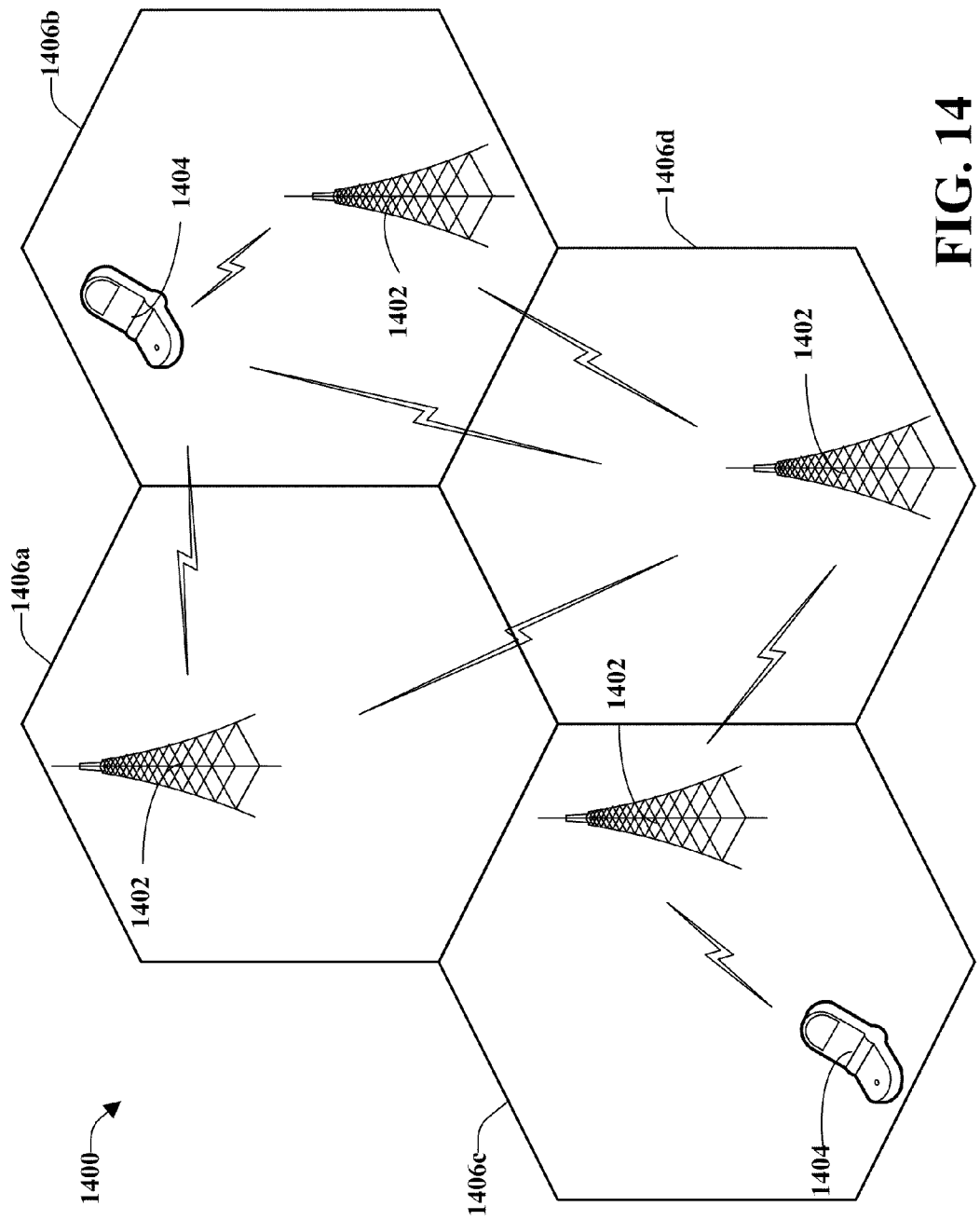
FIG. 14 depicts a block diagram of an example cell-based wireless communication arrangement suitable for one or more disclosed aspects.

FIG. 14 is an illustration of a planned or semi-planned wireless communication environment 1400, in accordance with various aspects. Wireless communication environment 1400 can comprise one or more BSs 1402 in one or more cells and/or sectors that receive, transmit, repeat, etc., wireless communication signals to each other and/or to one or more mobile devices 1404. As illustrated, each BS 1402 can provide communication coverage for a particular geographic area, illustrated as four geographic areas, labeled 1406a, 1406b, 1406c and 1406d. Each BS 1402 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 12, supra), as will be appreciated by one skilled in the art. Mobile devices 1404 can be, for example, cellular phones, smart phones, laptops, handheld communication devices, handheld computing devices, satellite radios, global positioning systems, PDAs, or any other suitable device for communicating over wireless communication environment 1400. Wireless communication environment 1400 can be employed in conjunction with various aspects described herein in order to facilitate utilization of supplemental wireless nodes in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture", "module", or "apparatus" as used herein is intended to encompass, in at least one aspect, a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for employing a half duplex supplemental wireless node (HD-SWN) in wireless communication, comprising:
   transmitting a relay pilot signal to a user equipment (UE) on a first set of orthogonal frequency division multiplex (OFDM) symbols in a subframe;
   receiving from a base station a wireless signal on a second set of OFDM symbols within the subframe, at least one OFDM symbol of the second set of OFDM symbols being interposed between at least two OFDM symbols of the first set of OFDM symbols that are non-contiguous in time;
   obtaining a channel quality indicator (CQI) or a precoding matrix indicator (PMI) from the UE served by the HD-SWN, the CQI or the PMI comprising a measurement of a controlling pilot signal transmitted by the base station and observed at the UE;
   forwarding the CQI or the PMI to the base station to facilitate estimating a modulation and coding scheme (MCS) for transmitting the relay pilot signal;
   receiving the MCS from the base station;
   transmitting the relay pilot signal in accordance with the MCS; and
   receiving a second CQI or a second PMI comprising a measurement of a concurrent transmission of the controlling pilot and the relay pilot signal as observed at the UE.

2. The method of claim 1, in which the relay pilot signal is a common reference signal (CRS).

3. The method of claim 1, in which:
   the first set of OFDM symbols are also used by a base station for transmitting a controlling pilot signal; and
   the base station is remotely located from the HD-SWN.

4. The method of claim 3, further comprising allocating a subset of the second set of OFDM symbols to receiving transmissions from the base station.

5. The method of claim 3, further comprising allocating a second subset of the second set of OFDM symbols to receiving transmissions from the UE that is wirelessly coupled with the HD-SWN.

6. The method of claim 1, further comprising:
   receiving an updated MCS from the base station that is configured for the concurrent transmission of the controlling pilot signal and the relay pilot signal; and
   transmitting the relay pilot signal in a subsequent subframe in accordance with the updated MCS.

7. The method of claim 1, further comprising transmitting the relay pilot signal on a first antenna or first antenna-group that is different from a second antenna or second antenna-group used for transmitting the controlling pilot signal.

8. The method of claim 1, further comprising transmitting the relay pilot signal on a first virtual antenna port that is different from a second virtual antenna port of the controlling pilot signal.

9. The method of claim 1, in which the subframe is a long term evolution (LTE) subframe.

10. An apparatus for wireless communication, comprising:
    a half duplex wireless transceiver configured to transmit and receive signals on separate orthogonal frequency division multiplex (OFDM) symbols of a subframe;
    a memory for storing instructions configured to control the half duplex wireless transceiver to switch between transmitting and receiving on contiguous OFDM symbols; and
    a data processor that executes modules configured to implement the instructions, the modules comprising:
       an acquisition module configured to identify a set of OFDM symbols used by a base station for transmitting a base station pilot signal; and
       a configuration module configured to control the half duplex wireless transceiver to:
       transmit a relay pilot signal to a user equipment (UE) on a first OFDM symbol of the subframe,
       receive a wireless signal on a second OFDM symbol of the subframe, and
       re-transmit the relay pilot signal to the UE on a third OFDM symbol of the subframe, the second OFDM symbol being interposed in time between the first OFDM symbol and the third OFDM symbol.

11. The apparatus of claim 10, in which the base station pilot signal is transmitted on each OFDM symbol of the set of OFDM symbols.

12. The apparatus of claim 10, in which the relay pilot signal and the base station pilot signal are common reference signals (CRSs).

13. The apparatus of claim 10, further comprising a feedback module configured to obtain a channel report including a measurement of a base station pilot signal observed at a UE served by the apparatus.

14. The apparatus of claim 13, in which the feedback module forwards the channel report to the base station for estimation of a modulation and coding scheme suited for the UE to decode a relay pilot transmitted by the half duplex wireless transceiver.

15. The apparatus of claim 10, further comprising a mediation module configured to identify a subset of OFDM symbols within the subframe that are unavailable for transmission or reception as a result of hardware time switching constraints of the half duplex wireless transceiver.

16. The apparatus of claim 15, in which the mediation module is further configured to adjust transmission times of the relay pilot signal such that the subset of OFDM symbols does not coincide with the first OFDM symbol or the third OFDM symbol.

17. The apparatus of claim 16, in which the mediation module is further configured to modify reception times of the half duplex wireless transceiver such that the subset of OFDM symbols does not coincide with the second OFDM symbol.

18. The apparatus of claim 10, in which the set of OFDM symbols comprises OFDM symbols 0, 4, 7 and 10 of the subframe if the base station transmits with a single or dual-antenna arrangement.

19. The apparatus of claim 10, in which the set of OFDM symbols comprises OFDM symbols 0, 1, 4, 7, 8 and 10 of the subframe if the base station transmits with a quad-antenna arrangement.

20. The apparatus of claim 10, in which the apparatus comprises one or more of:
a transparent repeater;
a transparent wireless relay;
a transparent pico cell;
a remote radio head;
a smart repeater;
an incremental redundancy relay, or a combination thereof.

21. An apparatus for wireless communication, comprising:
means for transmitting a relay pilot signal to a user equipment (UE) on a first set of orthogonal frequency division multiplex (OFDM) symbols in a subframe;
means for receiving from a base station a wireless signal on a second set of OFDM symbols within the subframe, at least one OFDM symbol of the second set of OFDM symbols being interposed between at least two OFDM symbols of the first set of OFDM symbols that are non-contiguous in time;
means for obtaining a channel quality indicator (CQI) or a precoding matrix indicator (PMI) from the UE served by the HD-SWN, the CQI or the PMI comprising a measurement of a controlling pilot signal transmitted by the base station and observed at the UE;
means for forwarding the CQI or the PMI to the base station to facilitate estimating a modulation and coding scheme (a MCS) for transmitting the relay pilot signal;
means for receiving the MCS from the base station;
means for transmitting the relay pilot signal in accordance with the MCS; and
means for receiving a second CQI or a second PMI comprising a measurement of a concurrent transmission of the controlling pilot and the relay pilot signal as observed at the UE.

22. An apparatus for wireless communication, the apparatus comprising:
a memory; and
at least one processor coupled to the memory, the at least one processor configured:
to transmit a relay pilot signal to a user equipment (UE) on a first set of orthogonal frequency division multiplex (OFDM) symbols in a subframe;
to receive from a base station a wireless signal on a second set of OFDM symbols within the subframe, at least one OFDM symbol of the second set of OFDM symbols being interposed between at least two OFDM symbols of the first set of OFDM symbols that are non-contiguous in time;
to obtain a channel quality indicator (a CQI) or a precoding matrix indicator (a PMI) from the UE served by the HD-SWN, the CQI or the PMI comprising a measurement of a controlling pilot signal transmitted by the base station and observed at the UE;
to forward the CQI or the PMI to the base station to facilitate estimating a modulation and coding scheme (a MCS) for transmitting the relay pilot signal;
to receive the MCS from the base station;
to transmit the relay pilot signal in accordance with the MCS; and
to receive a second CQI or a second PMI comprising a measurement of a concurrent transmission of the controlling pilot and the relay pilot signal as observed at the UE.

23. A computer program product, comprising:
a non-transitory computer-readable medium, comprising:
code to transmit a relay pilot signal to a user equipment (UE) on a first set of orthogonal frequency division multiplex (OFDM) symbols in a subframe;
code to receive from a base station a wireless signal on a second set of OFDM symbols within the subframe, at least one OFDM symbol of the second set of OFDM symbols being interposed between at least two OFDM symbols of the first set of OFDM symbols that are non-contiguous in time;
to obtain a channel quality indicator (a CQI) or a precoding matrix indicator (a PMI) from the UE served by the HD-SWN, the CQI or the PMI comprising a measurement of a controlling pilot signal transmitted by the base station and observed at the UE;
to forward the CQI or the PMI to the base station to facilitate estimating a modulation and coding scheme (a MCS) for transmitting the relay pilot signal;
to receive the MCS from the base station;
to transmit the relay pilot signal in accordance with the MCS; and
to receive a second CQI or a second PMI comprising a measurement of a concurrent transmission of the controlling pilot and the relay pilot signal as observed at the UE.

24. A method for wireless communication at a base station comprising:
receiving a channel quality indicator (CQI) or a precoding matrix indicator (PMI) from a remote wireless node, in which the CQI or the PMI comprises a measurement of a control pilot signal observed at a UE;
estimating a modulation and coding scheme (MCS) based, at least in part, on the received CQI or PMI;
transmitting control or data signaling information scheduled for a downlink (DL) transmission by the base station to the remote wireless node associated with the base station; and
transmitting the DL transmission to the user equipment (UE) from the base station on a single DL carrier, the DL transmission being concurrent with a transmission of the control or data signaling information to the UE by the remote wireless node, and the DL transmission from the base station to the UE being on a same set of orthogonal frequency division multiplex (OFDM) symbols as the transmission of the control or data signaling information from the remote wireless node to the UE, the control or data signaling information comprising the estimated MCS.

25. The method of claim 24, wherein transmitting the control or the data signaling information further comprises transmitting the control or the data signaling information via a wired or wireless backhaul network.

26. The method of claim 24, further comprising transmitting a common reference signal (CRS) to a set of UEs, the set of UEs using the CRS for decoding the DL transmission and the control or data signaling information.

27. The method of claim 26, further comprising identifying at least one of the set of UEs that observes a preferred DL signal from either the remote wireless node or the base station.

28. The method of claim 27, further comprising scheduling a second set of control or data signaling information for transmission to the at least one of the set of UEs exclusively via the remote wireless node or the base station.

29. The method of claim 27, further comprising identifying the preferred DL signal by receiving respective DL signal measurements of the base station and the remote wireless node from the at least one of the set of UEs, and comparing the respective DL signal measurements to a preference threshold based on signal strength, signal quality or signal path loss.

30. The method of claim 24, further comprising:
measuring an uplink (UL) signal from the UE;
receiving a commensurate measurement of the UL signal from the remote wireless node;
identifying a preferred wireless node for the UE by comparing a measurement of the UL signal at the network base station and the commensurate measurement to a threshold value; and
scheduling a second set of control or data signaling information for the UE exclusively to or from the preferred wireless node.

31. The method of claim 24, in which transmitting control or data signaling information for the DL transmission further comprises acknowledgement (ACK) or negative ACK (NACK) information, channel quality indicator (CQI) information, a request message, downlink data traffic, uplink data traffic, or a combination thereof.

32. The method of claim 24, further comprising:
referencing a distribution policy that allocates a portion of the control or signaling information or a subset of assigned resources involving a set of UEs to the remote wireless node; and
identifying the portion of the control or signaling information or the subset of assigned resources; in which transmitting control or data signaling information for the DL transmission to the remote wireless node comprises:
only transmitting the portion of the control or signaling information, or
specifying the subset of assigned resources that are allocated to the remote wireless node by the distribution policy.

33. The method of claim 32, wherein the distribution policy allocates the portion of the control or signaling information or the subset of assigned resources to the remote wireless node based at least in part on UE scheduling, UL signal strength measurements, or DL signal strength measurements, or a combination thereof.

34. The method of claim 24, further comprising transmitting to the remote wireless node a set of modulation symbols for decoding the control or signaling information, the remote wireless node using the set of modulation symbols as a reference signal to demodulate at least a portion of the control or signaling information prior to transmitting the control or signaling information concurrent with the DL transmission.

35. An apparatus configured for wireless communication, comprising:
a communication interface configured to communicate with a base station and for wireless communication with a user equipment (UE);
a memory configured to store instructions for coordinating wireless communications of the apparatus and the base station; and
a data processor configured to execute the instructions, the instructions comprising:
instructions to obtain at least a subset of traffic involving the UE and a signal time period for reception of the subset of traffic from the base station or transmission of the subset of traffic to the UE;
instructions to transmit to the UE or receive from the UE the subset of traffic on a single carrier frequency, the transmission being concurrent with a transmission to the UE by the base station and the reception being concurrent with a reception of the traffic from the UE by the base station, and the transmission from the base station to the UE being on a same set of orthogonal frequency division multiplex (OFDM) symbols as the transmission from the communication module to the UE;
instructions to obtain a channel quality indicator (CQI) or a precoding matrix indicator (PMI) from the UE served by the apparatus, the CQI or the PMI comprising a measurement of a controlling pilot signal transmitted by a base station and observed at the UE;
instructions to forward the CQI or the PMI to the base station to facilitate estimating a modulation and coding scheme (a MCS) for transmitting the relay pilot signal;
instructions to receive the MCS from the base station;
instructions to transmit the relay pilot signal in accordance with the MCS; and
instructions to receive a second CQI or a second PMI comprising a measurement of a concurrent transmission of the controlling pilot and the relay pilot signal as observed at the UE.

36. The apparatus of claim 35, in which the communication with the base station is via a wired backhaul link.

37. The apparatus of claim 35, in which the communication with the base station is via a wireless backhaul link.

38. The apparatus of claim 35, further comprising a coding module configured to generate a common reference signal (a CRS) for demodulating at least the subset of traffic.

39. The apparatus of claim 38, wherein the communication module is further configured to transmit the CRS to the UE.

40. The apparatus of claim 39, in which the communication module transmits the CRS on a set of OFDM symbols used by the base station for transmitting the CRS, the CRS being transmitted on the set of OFDM symbols to facilitate joint transmission of the CRS and at least the subset of traffic by the base station and the apparatus.

41. The apparatus of claim 38, in which the coding module is further configured to receive from the base station a set of modulation symbols that can be used for demodulating at least the subset of traffic by the apparatus, the set of modulation symbols comprising pre-determined time-frequency symbols and pre-determined values thereof that can be used as a proxy for the CRS.

42. The apparatus of claim 35, in which the cooperation module is further configured to obtain a full set of traffic involving the UE from the base station, and
further comprising a priority module configured:
to reference an incremental redundancy policy governing the apparatus;
to identify and distinguish the subset of traffic from a remainder of the full set of traffic based on the incremental redundancy policy; and
to provide the communication module with a subset of traffic for concurrent transmission or reception in conjunction with the base station at the signal time period.

43. The apparatus of claim 35, further comprising a priority module configured:
to use UL or DL signal measurements involving the UE to infer whether the UE is within a preferred range of either the apparatus or the base station, and
to allocate at least a portion of subsequent traffic exclusively to either the apparatus or the base station until an inferred range of the UE is no longer within the preferred range.

44. The apparatus of claim 43, in which:
the inferred range is derived from a threshold signal characteristic based at least in part on the UL or DL signal measurements, and
the threshold signal characteristic comprises a threshold signal quality, a threshold signal strength, or a threshold signal path loss characteristic, or a combination thereof.

45. The apparatus of claim 35, wherein the apparatus comprises one or more of:
- a relay node;
- a pico cell;
- a repeater node;
- a smart repeater node;
- a remote radio head;
- a transparent node, or
- a combination thereof.

46. An apparatus configured for wireless communication, comprising:
- means for receiving a channel quality indicator (CQI) or a precoding matrix indicator (PMI) from a remote wireless node, in which the CQI or the PMI comprises a measurement of a control pilot signal observed at a UE;
- means for estimating a modulation and coding scheme (MCS) based, at least in part, on the received CQI or PMI;
- means for transmitting control or data signaling information scheduled for a downlink (DL) transmission by a network base station to a remote wireless node over a backhaul network; and
- means for transmitting the DL transmission to the UE from the base station on a single DL carrier, the DL transmission being concurrent with a transmission of the control or data signaling information to the UE by the remote wireless node, and the DL transmission from the base station to the UE being on a same set of orthogonal frequency division multiplex (OFDM) symbols as the transmission of the control or data signaling information from the remote wireless node to the UE, the control or data signaling information comprising the estimated MCS.

47. An apparatus for wireless communication, the apparatus comprising:
- a memory; and
- at least one processor configured:
  - to receive a channel quality indicator (CQI) or a precoding matrix indicator (PMI) from a remote wireless node, in which the CQI or the PMI comprising a measurement of a control pilot signal observed at a UE;
  - to estimate a modulation and coding scheme (MCS) based, at least in part, on the received CQI and PMI;
  - to transmit control or data signaling information scheduled for a downlink (DL) transmission by a network base station to a remote wireless node over a backhaul network; and
  - to transmit the DL transmission to the UE from the base station on a single DL carrier, the DL transmission being concurrent with a transmission of the control or data signaling information to the UE by the remote wireless node, and the DL transmission from the base station to the UE being on a same set of orthogonal frequency division multiplex (OFDM) symbols as the transmission of the control or data signaling information from the remote wireless node to the UE, the control or data signaling information comprising the estimated MCS.

48. A computer program product, comprising: a non-transitory computer-readable medium, comprising:
- code to receive a channel quality indicator (CQI) or a precoding matrix indicator (PMI) from a remote wireless node, in which the CQI or the PMI comprising a measurement of a control pilot signal observed at a UE;
- code to estimate a modulation and coding scheme (MCS) based, at least in part, on the received CQI and PMI;
- code to transmit control or data signaling information scheduled for a downlink (DL) transmission by a network base station to a remote wireless node over a backhaul network; and
- code to transmit the DL transmission to a user equipment (UE) at the network base station on a single DL carrier, the DL transmission being concurrent with a transmission of the control or data signaling information to the UE by the remote wireless node, and the DL transmission from the base station to the UE being on a same set of orthogonal frequency division multiplex (OFDM) symbols as the transmission of the control or data signaling information from the remote wireless node to the UE, the control or data signaling information comprising the estimated MCS.

* * * * *